US 6,578,159 B1

(12) United States Patent
Kitagawa et al.

(10) Patent No.: US 6,578,159 B1
(45) Date of Patent: Jun. 10, 2003

(54) TRANSACTION PROCESSING METHOD AND APPARATUS

(75) Inventors: Makoto Kitagawa, Fujisawa (JP); Tetsuya Hashimoto, Tokyo (JP); Akira Kito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/443,102

(22) Filed: Nov. 18, 1999

(30) Foreign Application Priority Data

Nov. 27, 1998 (JP) .......................................... 10-336699

(51) Int. Cl.$^7$ ............................................... G06F 11/00
(52) U.S. Cl. ............................ 714/15; 714/19; 707/202
(58) Field of Search ........................... 707/202; 714/15, 714/19

(56) References Cited

U.S. PATENT DOCUMENTS

| 5,287,501 A | * | 2/1994 | Lomet .......................... 707/202 |
| 5,386,554 A | * | 1/1995 | Nozaki ......................... 707/202 |
| 5,465,328 A | * | 11/1995 | Dievendorff et al. ......... 707/202 |
| 5,832,203 A | * | 11/1998 | Putzolu et al. ................ 714/16 |
| 5,878,206 A | * | 3/1999 | Chen et al. .................... 707/10 |
| 5,940,839 A | * | 8/1999 | Chen et al. .................... 707/10 |
| 5,983,215 A | * | 11/1999 | Ross et al. ...................... 707/2 |
| 6,012,094 A | * | 1/2000 | Leymann et al. ............ 707/202 |
| 6,182,241 B1 | * | 1/2001 | Ngai et al. .................... 707/202 |
| 6,185,577 B1 | * | 2/2001 | Nainani et al. .............. 707/201 |
| 6,295,610 B1 | * | 9/2001 | Ganesh et al. ............... 707/202 |
| 6,308,287 B1 | * | 10/2001 | Mitchell et al. ............. 707/202 |

OTHER PUBLICATIONS

Haerder et al. Principles of Transaction–Oriented Database Recovery.ACM Computing Survery, vol. 15, No. 4, Dec. 1983.*
P. A. Berstein et al, "Principle of Transaction Processing", Morgan Kaufmann Publishers, Inc., pp. 8–14, and pp. 120–121.

* cited by examiner

Primary Examiner—Robert Beausoliel
Assistant Examiner—Yolanda L. Wilson
(74) Attorney, Agent, or Firm—Antonelli, Terry, Stout & Kraus, LLP

(57) ABSTRACT

In a transaction processing method for executing a series of a plurality of transactions in accordance with a workflow, compensation processing is registered as an error recovery flow when each transaction is executed, the compensation processing executing error recovery processing when an error occurs while the transaction is executed, and a series of compensation processing is executed in parallel in accordance with the registered error recovery flow when an error occurs while any of the transaction is executed.

9 Claims, 24 Drawing Sheets

FIG.4

| REQUEST MESSAGE SEQUENTIAL NUMBER (401) | REQUEST MESSAGE BODY (402) | NORMAL PROCESSING FLOW ID (403) | ERROR RECOVERY FLOW ID (404) | SERVER 1 PROCESSING SEQUENTIAL NUMBER (405) | DATA (406) | SERVER 2 PROCESSING SEQUENTIAL NUMBER (407) | DATA (408) | SERVER 3 PROCESSING SEQUENTIAL NUMBER (409) | DATA (410) | REPLY MESSAGE SEQUENTIAL NUMBER (411) | REPLY MESSAGE BODY (412) |
|---|---|---|---|---|---|---|---|---|---|---|---|
| 123 | XXX | 3 | 2 | 456 | YYY | 789 | ZZZ | 321 | ABC | 654 | DEF |
|  |  |  |  |  |  |  |  |  |  |  |  |
|  |  |  |  |  |  |  |  |  |  |  |  |
|  |  |  |  |  |  |  |  |  |  |  |  |

| REQUEST MESSAGE SEQUENTIAL NUMBER 1302 | REQUEST MESSAGE BODY 1303 | NORMAL PROCESSING FLOW ID 1304 | QUEUE ID 1301 |
|---|---|---|---|
|  |  |  |  |
| 123 | XXX | 3 | 5 |
|  |  |  |  |
|  |  |  |  |

| PROCESSING ID = REPLY MESSAGE PROCESSING PROGRAM |
|---|
| TARGET ID = CHANNEL |
| REPLY MESSAGE SEQUENTIAL NUMBER = AAA |
| PATH ID = D |
| DATA |

— 1606

| PROCESSING ID = JOIN |
|---|
| PATH ID BEFORE JOIN = B,C |
| PATH ID AFTER JOIN = D |

— 1605

| PROCESSING ID = TRANSACTION 3 REQUEST PROCESSING PROGRAM |
|---|
| TARGET ID = SERVER 3 |
| PROCESSING SEQUENTIAL NUMBER = 789 |
| PATH ID = C |
| DATA |

— 1604

| PROCESSING ID = TRANSACTION 2 REQUEST PROCESSING PROGRAM |
|---|
| TARGET ID = SERVER 2 |
| PROCESSING SEQUENTIAL NUMBER = 456 |
| PATH ID = B |
| DATA |

— 1603

| PROCESSING ID = SPLIT |
|---|
| PATH ID BEFORE SPLIT = A |
| PATH ID AFTER SPLIT = B,C |

— 1602

| PROCESSING ID = TRANSACTION 1 REQUEST PROCESSING PROGRAM |
|---|
| TARGET ID = SERVER 1 |
| PROCESSING SEQUENTIAL NUMBER = 123 |
| PATH ID = A |
| DATA |

— 1601

TRANSACTION PROCESSING METHOD AND APPARATUS

BACKGROUND OF THE INVENTION

The present invention relates to a transaction processing system for executing a series of transactions in accordance with a workflow, and more particularly to a transaction processing system for executing effective error recovery processing when an error occurs during the execution of a transaction.

In a trip reservation system requiring the reservation of hotels and air tickets or in a system requiring a remittance of money between a plurality of banks, it is necessary to execute transaction processing by accessing a plurality of servers in response to a request from a channel. The transaction processing means the execution of a program having properties of atomicity, consistency, isolation and durability. Such transaction processing was reviewed, for example, in "Principles of Transaction Processing", Morgan Kaufmann Publishers, Inc., pp. 8–14. In this specification, systems which transmit a request message to a workflow controlling system are collectively called a "channel" hereinafter.

While a series of processing is executed for one transaction, it is necessary to lock corresponding data until the transaction is terminated at each server. Therefore, other processing is requested to stand by for a long time, which may pose a problem of poor system performance. To solve this, generally, a series of processing is divided into transactions on the server access unit and each transaction is executed in accordance with a workflow constituted of a plurality of transactions.

In such a system, if an error occurs during the execution of a transaction in accordance with a workflow, it is necessary to execute error recovery processing for aborting a series of transactions which has been executed until the error occurs. To this end, the contents of execution of each transaction have been enqueued conventionally in a queue as journal information, and when an error occurs, each piece of the journal information is dequeued starting from the last of the queue. Such a system was reviewed, for example, in "Principles of Transaction Processing", Morgan Kaufmann Publishers, Inc., pp. 120–121.

SUMMARY OF THE INVENTION

In the conventional system described above, if a transaction accessing a server is aborted by compensation transaction processing and before this abortion another transaction accesses the same server, then the other transaction is influenced by the results of the first transaction which is later aborted. For example, in the case of a hotel reservation transaction, a reservation cannot be made because of no empty room until an empty room is made by any cancel. It is desired therefore that the error recovery processing time be as short as possible.

With the conventional system, even if transactions executed in parallel by split are to be recovered, compensation transactions are executed one at a time. It takes therefore a long time to complete the error recovery processing for a series of transactions.

It is an object of the present invention to solve the above-described problems and improve the efficiency of error recovery processing.

It is another object of the present invention to provide techniques capable of efficiently executing error recovery processing even if a transaction processing system receives request messages at the same time from a plurality of channels.

According to the present invention, in a transaction processing system for executing a series of transactions in accordance with a workflow, an error recovery flow for performing error recovery processing or journal information representative of the contents of an executed transaction are registered when the transaction is executed. When an error occurs while the transaction is executed, a series of compensation processing is executed in parallel in accordance with the registered error recovery flow or journal information.

In the transaction processing system of this invention, a transaction is executed in accordance with the workflow, and the compensation processing is registered as the error recovery flow when the transaction is executed, the compensation processing executing error recovery processing when an error occurs while the transaction is executed.

When a split process is executed in accordance with the workflow, a join process is registered in the error recovery flow in correspondence with the split process. When the join process is executed in accordance with the workflow, the split process is registered in the error recovery flow in correspondence with the join process.

When an error occurs while the transaction is executed, a series of compensation processing is executed in accordance with the registered error recovery flow. Since the error recovery flow is generated in correspondence with the normal processing flow in the workflow, the portion executed in parallel by the split process during the transaction execution is executed in parallel also for the compensation processing. The compensation processing can therefore be executed at high speed.

In the transaction processing system of this invention, the transaction is executed in accordance with the workflow, and the journal information representative of the contents of an executed transaction is registered.

When an error occurs while a transaction is executed, the registered journal information is acquired and the compensation transaction is executed in parallel in accordance with the contents of each transaction registered in the journal information. In this case, the compensation transaction may be executed in parallel in accordance with the path of the workflow or the target destination. Since the compensation transaction can be executed in parallel in accordance with the journal information, the compensation processing can be executed at high speed.

As above, according to the transaction processing system of this invention, since the error recovery processing is executed in parallel for each path generated by the split process in the normal processing flow, the efficiency of the error recovery processing can be improved.

BRIEF DESCRIPTION OF THE DRAWINGS

FIG. 4 is a diagram showing an example of the contents of a business process DB table according to the first embodiment.

FIG. 15 is a diagram showing an example of the contents of a business process DB table according to the second embodiment.

FIG. 19 is a diagram showing an example of the contents of a journal queue 1101 according to the second embodiment.

DETAILED DESCRIPTION OF THE EMBODIMENTS

1st Embodiment

A transaction processing system according to the first embodiment will be described in which error recovery processing is executed in parallel for each path generated by a split process during normal transaction processing.

Figure 1:
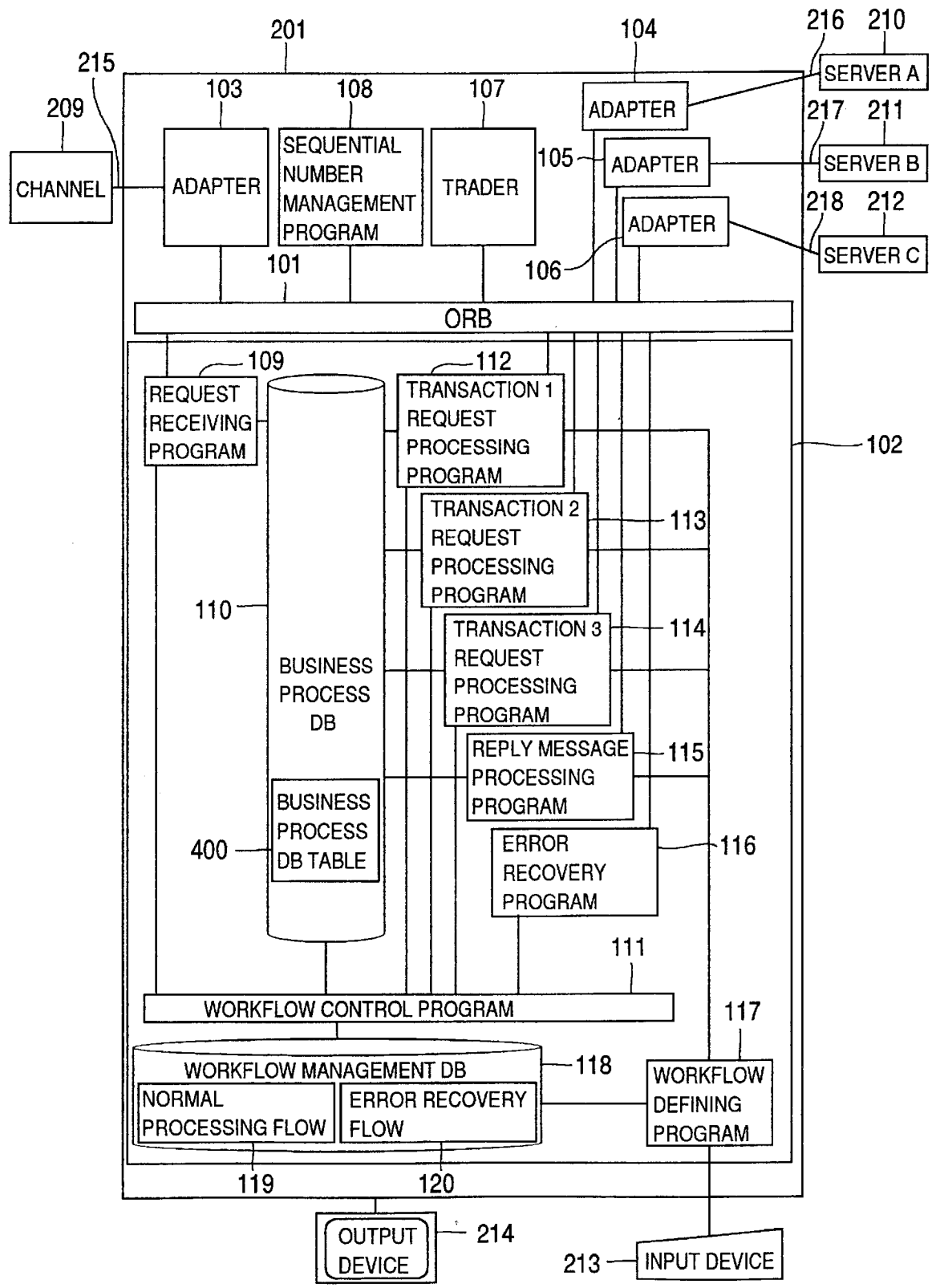
FIG. 1 is a block diagram showing the software structure of a workflow control system according to a first embodiment of the invention.

FIG. 1 is a block diagram showing the software structure of a workflow control system of the first embodiment. In this embodiment, each component constituting software of the workflow control system is configured as an object.

Figure 2:
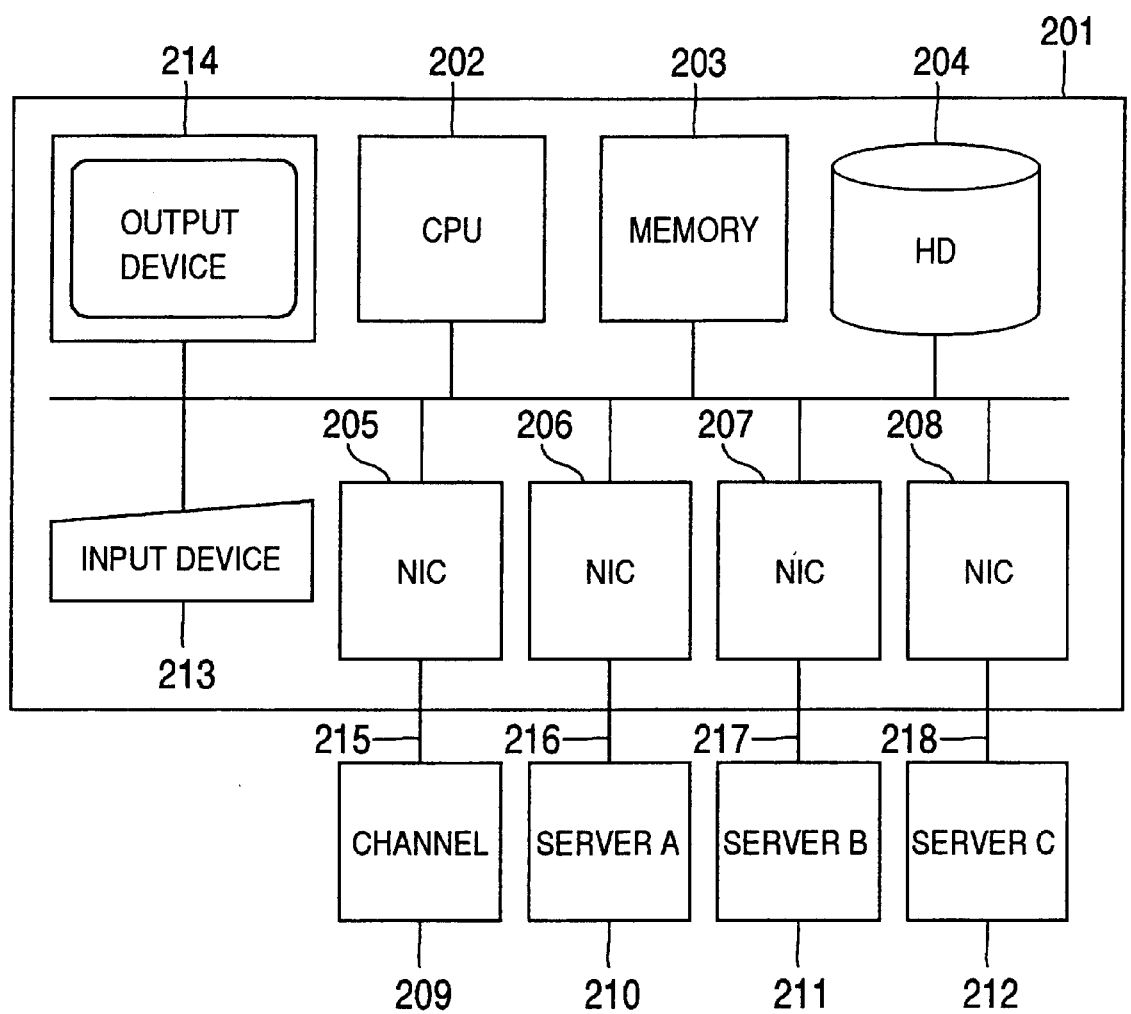
FIG. 2 is a schematic diagram showing the hardware structure of a transaction processing system according to the first embodiment.

FIG. 2 is a schematic diagram showing the hardware structure of the transaction processing system of the embodiment. The system of the embodiment is constituted of: a workflow control system 201; a channel 209 connected to the system 201 via networks 215 to 218; and servers 210 to 212.

The workflow control system 201 is a system for analyzing a request message sent from the channel 209, and executing a process so as to satisfy the request from the channel while requesting the server 210–212 to execute a transaction. The channel 209 is a system for transmitting a request message to the workflow control system 201 in accordance with a request from a user. The server 210–212 is a system for executing a transaction in accordance a request from the workflow control system 201. In this example, it is assumed that each of the servers 210 to 212 provides different services. In this embodiment, although one channel and three servers are connected, more channels and servers may be connected.

The workflow control system 201 is constituted of a CPU 202, a memory 203, a hard disk drive 204, network interface controllers (NICs) 205 to 208, an input device 213, and an output device 214. The hard disk drive 204 is provided with a software group for performing necessary processing in accordance with a workflow. The software group is loaded on the memory 203 and executed by CPU 202. The network interface controllers 205 to 208 control interfaces with the networks 215 to 218 for the connection to the channel 209 and servers 210 to 212.

Next, the software structure of the workflow control system 201 of this embodiment will be described with reference to FIG. 1. The workflow control system 201 is constituted of: an object request broker ORB 101; a trader 107; adapters 103 to 106; a sequential number management program 108; and a workflow execution program 102.

ORB 101 provides a messaging mechanism for the transmission/reception of a request and its response between objects. Each component in the workflow control system 201 communicates with another component by using ORB 101.

The trader 107 provides a means for searching an object in accordance with the service contents of each component. The adapters 103 to 106 together with the workflow execution program 102 register their service contents in the trader 107. For the transmission of a message, each adapter receives the target object reference from the trader 107 which searched the services. The object reference is data which contains information for uniquely identifying the target object. Each object requests ORB to transmit a message to the target object by using the object reference.

The adapters 103 to 106 are components which transfer a message between the channel 209 and servers 210 to 212 and the workflow execution program 102. The adapters 103 to 106 are connected to the channel 209 and servers 210 to 212 by different protocols, and perform a protocol control and message format conversion for the connection to the channel 209 and servers 210 to 212 via the networks 215 to 218.

The sequential number management program 108 is a component which assigns a sequential number specific to each message to be transferred in the workflow control system 201. The sequential number management program 108 manages sequential numbers in a sequential order, and in response to a request from each component, returns a sequential number unique in the workflow control system 201. Each component assigns a message with the sequential number received from the sequential number management program 108.

The workflow execution program 102 is a component which receives a request message from the channel 209, and processes the request from the channel 209 by requesting the server 210–212 to execute a transaction, in accordance with a workflow.

The workflow execution program 102 has: a request receiving program 109 for receiving a request from the channel 209; a business process database (DB) 110 for storing intermediate data of the request contents and processes; a workflow control program 111 for launching a transaction in accordance with a workflow; a workflow management DB 118 for storing workflows; transaction request processing programs 112 to 114 which are launched by the workflow control program 111 and request the server 210–212 to process a transaction; a reply message processing program 115 which is launched by the workflow control program 111 and transmits a reply message to the channel 209; a workflow defining program 117 for defining workflows in the workflow management DB 118; and an error recovery program 116 for performing error recovery processing when an error occurs during the execution of a transaction in accordance with a workflow.

Figure 3:
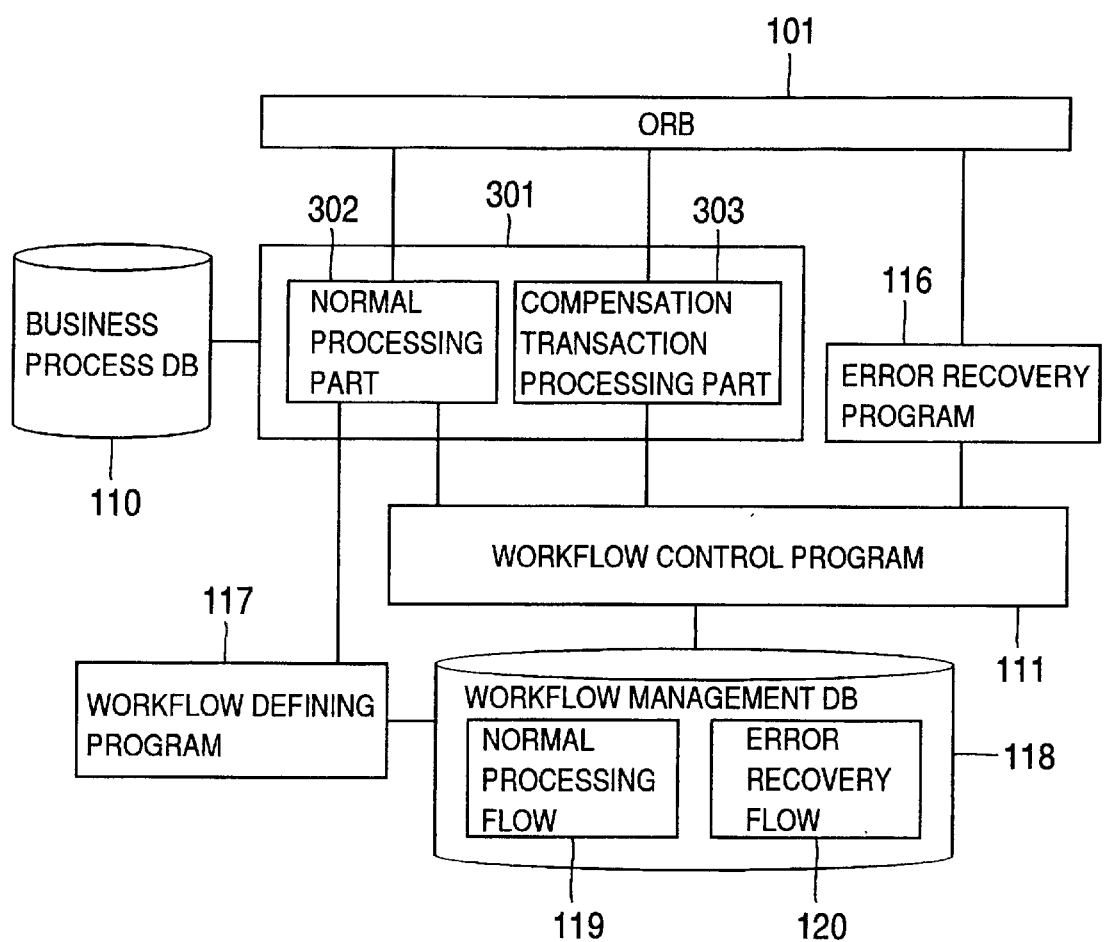
FIG. 3 is a schematic diagram illustrating the outline configuration of request message processing programs 112 to 114 and a reply message processing program 115 according to the first embodiment.

FIG. 3 shows the outline configuration of the transaction request processing programs 112 to 114 and reply message processing program 115. As shown in FIG. 3, the workflow control system 201 of this embodiment has a normal processing part 302 and a compensation transaction processing part 303.

The normal processing part 302 registers, as the error recovery flow 120, compensation processing which executes error recovery processing when an error occurs during the execution of a transaction, when the transaction is to be executed. The compensation transaction processing part 303 executes in parallel a series of compensation processing in accordance with the defined error recovery flow 120, after an error occurs during the execution of a transaction.

A program for making the workflow control system 201 function as the normal processing part 302 and compensation transaction processing part 303 is assumed to be recorded in a recording medium such as a CD-ROM, loaded on a magnetic disk or the like, and then loaded on a memory to be executed. The recording medium for storing this program may be other medium different from CD-ROM.

A processing program 301 shown in FIG. 3 includes the transaction request processing programs 112 to 114 and reply message processing program 115 which are constituted of the normal processing part 302 for requesting the server 210–212 to execute a transaction and the compensation transaction processing part 303 for aborting a normally executed transaction.

The workflow management DB 118 and business process DB 110 are stored in a hard disk of the hard disk drive 204. The workflow management DB 118 stores the normal processing flow 119 which writes a normal workflow and the error recovery flow 120 which is executed when an error occurs. The business process DB 110 stores a business process DB table such as shown in FIG. 4.

FIG. 4 is a diagram showing an example of the business process DB of this embodiment. Each row of the business process DB is constituted of: a request message sequential number 401 assigned to a request message; a request message body 402; a normal processing flow ID 403 for identifying the normal processing flow 119; an error recovery flow ID 404 for identifying the error recovery flow 120; processing sequential numbers 405, 407 and 409 assigned to transactions by the servers 210 to 212; data 406, 408 and 410 obtained from reply messages from the servers 210 to 212; a reply message sequential number 411 for the channel 209; and a reply message body 412.

A system administrator of the workflow control system 201 registers in advance the normal processing flow 119 by using the input device 213. The workflow defining program 117 provides commands and GUI for defining the workflow, and defines the input workflow in the normal processing flow 119 of the workflow management DB 118. When the workflow is to be defined, the system administrator assigns the workflow with the normal processing flow ID 403 for uniquely identifying the workflow. By using this ID, the workflow control program 111 can manage a plurality of workflows registered in the normal processing flow 119. An example of the normal processing flow 119 registered in the above manner is shown in FIG. 5.

Figure 5A:
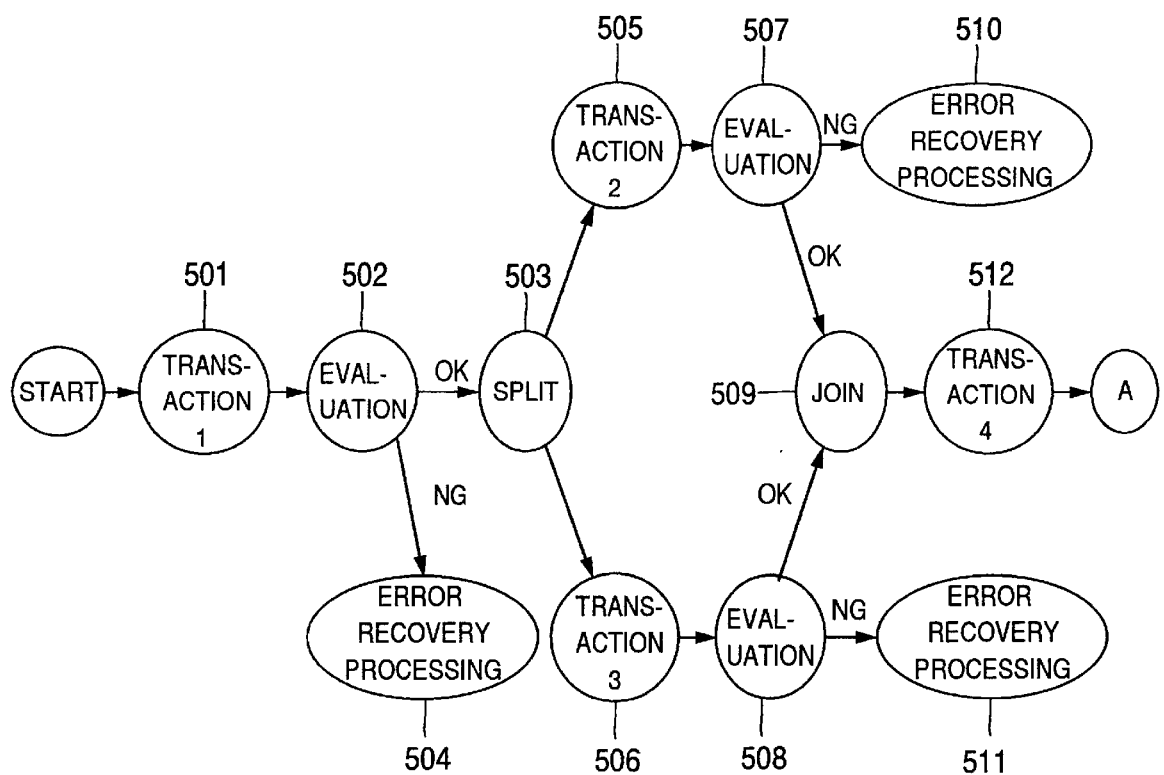
FIGS. 5A and 5B are diagrams showing an example of a normal processing flow 119 according to the first embodiment.
Figure 5B:
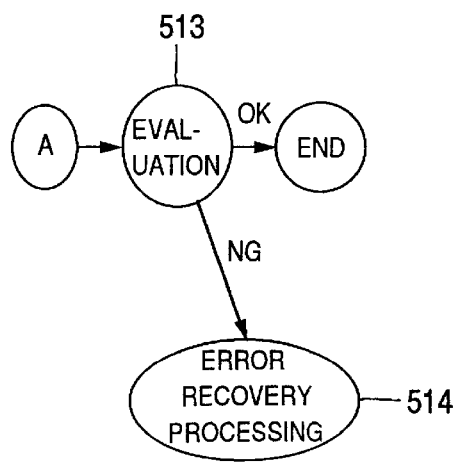

FIG. 5 is a diagram showing an example of the normal processing flow 119 of this embodiment. At nodes 501, 505, 506 and 512 writing transactions of the workflow, programs for executing corresponding transactions are defined.

In this embodiment, the transaction processing program 301 is prepared for each transaction, and its normal processing part 302 is assembled as an object. This object is defined as an object to be launched at each node. At the error recovery nodes 504, 510, 511 and 514, the error recovery program 116 is defined as an object to be launched. The contents to be defined at the error recovery node are the same at any position in the workflow.

In the following, an operation following the workflow shown in FIG. 5 after a request message is received from the channel 209, will be described. The adapter 103 receives a request message from the channel 209, acquires the sequential number of the request message from the sequential number management program 108, and adds the sequential number of the request message. Next, the object reference of the request receiving program 109 is acquired by using the trader 107, and the request message is transmitted to the request receiving program 109 by using the object reference.

Upon reception of the request message from the adapter 103, the request receiving program 109 registers the request message sequential number 401 and request message body 402 in the business process DB table 400. In accordance with the body of the request message, the corresponding normal processing flow 119 is determined, and the normal processing flow ID 403 for identifying this normal processing flow 119 is registered. The error recovery flow ID 404 for identifying the error recovery flow 120 is generated and registered. Thereafter, the workflow control program 111 is requested to execute the normal processing flow 119. At this time, the request receiving program 109 passes the request message sequential number 401 and normal processing flow ID 403 to the workflow control program 111 as its inputs.

The workflow control program 111 reads the requested workflow from the workflow management DB, and executes processing in accordance with the contents written in the normal processing flow 119 such as shown in FIG. 5. The workflow control program 111 sequentially executes transactions in the order written in the workflow, performs evaluation, split and join processes. At the transaction node in the workflow, the normal processing part 302 is defined which is to be launched by the transaction. The workflow control program 111 launches the defined normal processing part 302 when the transaction is executed.

In accordance with the normal processing flow 119 shown in FIG. 5, the workflow control program 111 starts executing the workflow, and launches the normal processing part 302 of the transaction 1 request processing program 112 in order to execute the transaction 1 (node 501).

Figure 6:
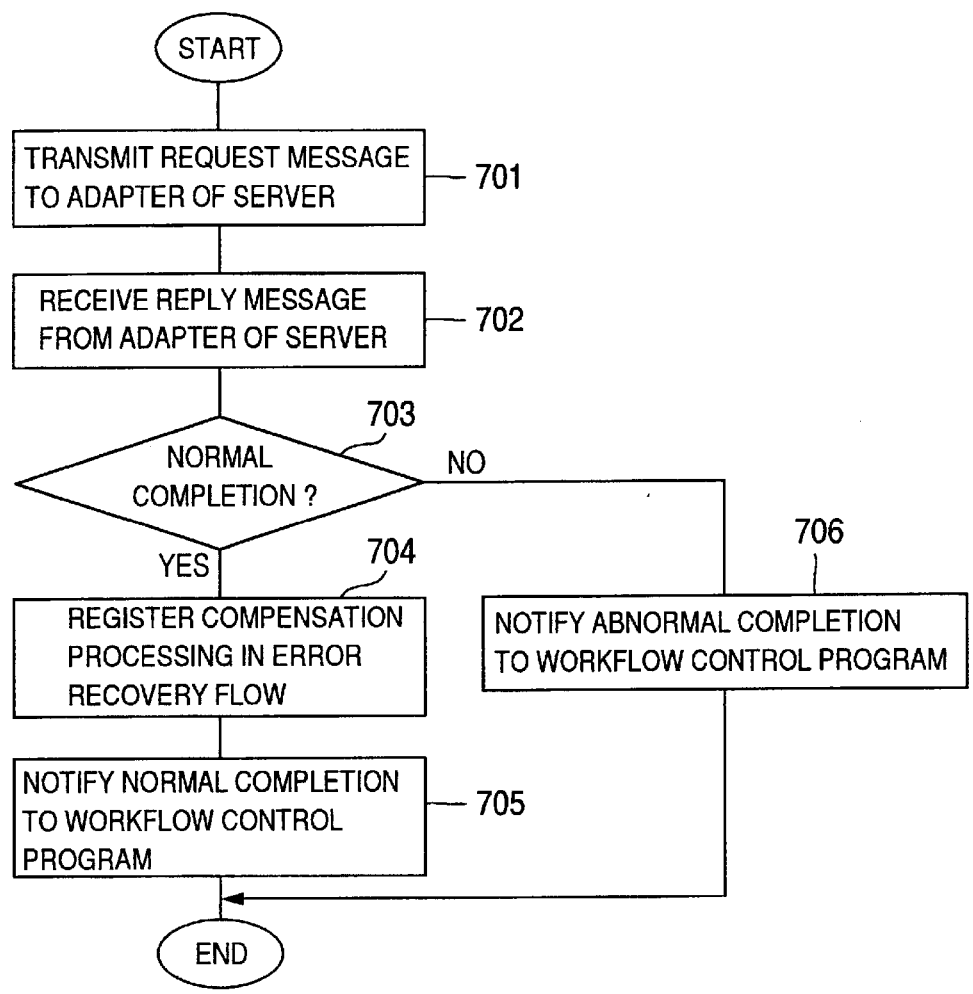
FIG. 6 is a flow chart illustrating the procedure of transaction request processing programs 112 to 114 to be executed by a normal processing part 302 according to the first embodiment.

FIG. 6 is a flow chart illustrating the procedure of the transaction request processing programs 112 to 114 to be executed by the normal processing part 302 according to the embodiment. The normal processing part 302 performs necessary processing in accordance with the procedure illustrated in FIG. 6. This procedure to be executed by the normal processing part 302 will be described with reference to FIG. 6.

The workflow control program 111 passes the request message sequential number 401 to the normal processing part 302 as its input. The normal processing part 302 reads the contents of the business process DB table 400 at the row corresponding to the request message sequential number 401, and generates a request message for the services necessary for the requested processing. The object reference of the adapter connected to the server which can provide the necessary services is acquired by using the trader 107, and the request message is transmitted (Step 701).

For example, the normal processing part 302 of the transaction 1 request processing program 112 acquires the object reference of the adapter 104 connected to the server 210, and then the request message is transmitted. Upon reception of the request message, the adapter 104 transmits the request message to the server 210 via the network 216. Upon reception of the request message, the server 210 performs requested processing and thereafter transmits a reply message to the adapter 104, the reply message including a processing number assigned by the server 210 and processing result data. Upon reception of the reply message from the server 210, the adapter 104 transmits it to the normal processing part 302 of the transaction 1 request processing program 112.

Upon reception of the reply message from the adapter 104, the normal processing part 302 stores the processing sequential number 405 and the data 406 contained in the reply message in the business process DB table 400 (Step 702). Next, the normal processing part 302 evaluates whether the processing for the request message has been completed normally (Step 703). If normally completed, the normal processing part 302 registers a compensation transaction for aborting its processing in the error recovery flow 120 (Step 704).

The workflow defining program 117 is providing the normal processing part 302 with an interface for the definition of the error recovery flow 120. By using this interface, the normal processing part 302 registers the compensation transaction in the error recovery flow 120. At this time, the normal processing part 302 reads the error recovery flow ID 404 from the business process DB table 400, and requests the registration by designating ID 404.

Upon reception of the registration request, the workflow defining program 117 newly generates the error recovery flow 120 if the error recovery flow 120 identified by the designated ID does not exist, and registers the node writing the execution of the compensation transaction. The compensation transaction is written by a task of launching the compensation transaction processing part 303. Lastly, the normal processing part 302 notifies a normal completion to the workflow control program 111 (Step 705) to terminate the procedure.

If it is evaluated at Step 703 that the request to the server 210 is not normally completed, the normal processing part notifies an abnormal completion to the workflow control program 111 to thereafter terminate the procedure (Step 706).

Figure 7:
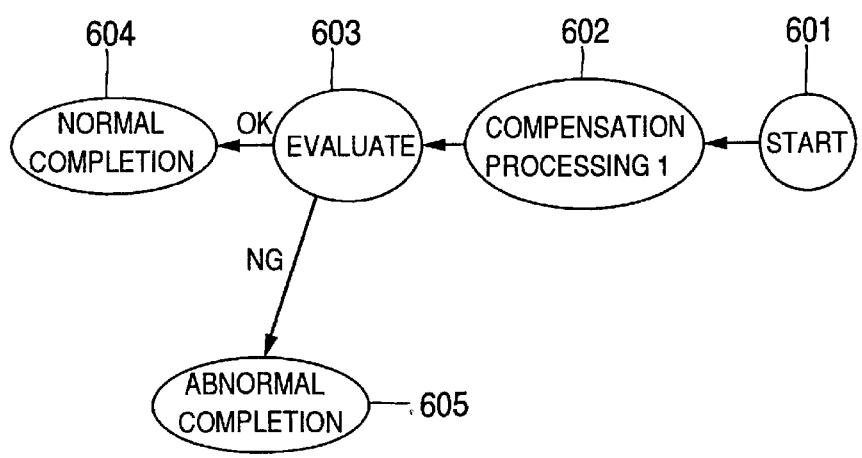
FIG. 7 is a diagram showing an example of an error recovery flow 120 according to the first embodiment.

FIG. 7 is a diagram showing an example of the error recovery flow 120 according to the embodiment. The error recovery flow 120 shown in FIG. 7 is registered when the transaction 1 (node 501) is completely processed.

Upon request of the registration of the compensation transaction, the workflow defining program 117 generates the error recovery flow having the passed ID and defines it in the error recovery flow 120 of the workflow management DB 118. The start node 610 and end node 604 are added when the workflow defining program 117 defines the error recovery flow 120 at the first time. Compensation processing 1 (node 602) corresponds to a compensation transaction requested to be defined at Step 704 in FIG. 6. In this example, the normal processing part 302 adds the compensation transaction together with an evaluate node 603 and an error node 605.

Reverting to the normal processing flow 119 shown in FIG. 5, the operation will be further described. After the transaction 1 (node 501) is processed completely as described above, the workflow control program 111 evaluates a completion notice supplied from the transaction processing program 301 (node 502), and if the normal completion, performs a split process (node 503). If an abnormal completion is notified from the transaction processing program 301, error recovery processing (node 504) is executed. This error recovery processing will be later described.

Figure 8:
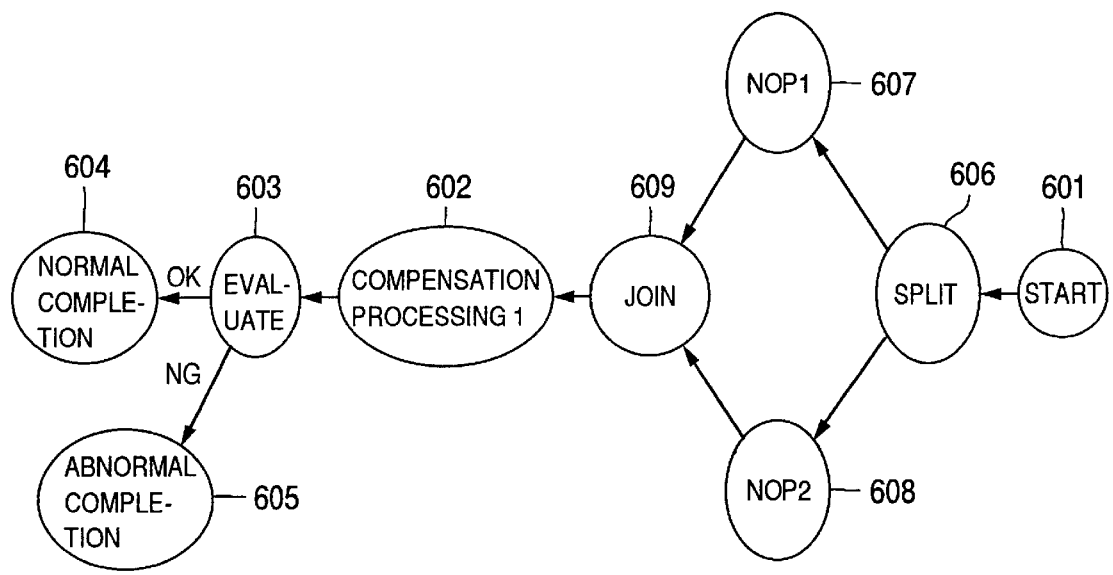
FIG. 8 is a diagram showing an example of the error recovery flow 120 according to the first embodiment.

FIG. 8 is a diagram showing an example of the error recovery flow 120 according to the embodiment. As shown in FIG. 8, in the split process, the workflow control program 111 registers a join node 609, a split node 606, a NOP 1 (node 607) and a NOP 2 (node 608) in the error recovery flow 120. NOP 1 and NOP 2 mean that no operation is performed.

The workflow control program 111 checks the number of paths to be executed in parallel after the split process, and registers NOP nodes as many as the number of paths. Thereafter, the workflow control program 111 executes in parallel the transactions 2 and 3.

The workflow control program 111 launches the transaction 2 request processing program 113 at the transaction 2

(node 505), and launches the transaction 3 request processing program 114 at the transaction 3 (node 506). Both the transaction request processing programs operate by the same procedure shown in FIG. 6. The transaction 2 request processing program 113 requests the services provided by the server 211 via the adapter 105, whereas the transaction 3 request processing program 114 requests the services provided by the server 212 via the adapter 106.

The process results of each transaction are stored in the business process DB table 400 similar to the transaction 1 (node 501). The process results of the transaction 2 are stored in the processing sequential number 407 and data 408, and the process results of the transaction 3 are stored in the processing sequential number 409 and data 410.

Figure 9:
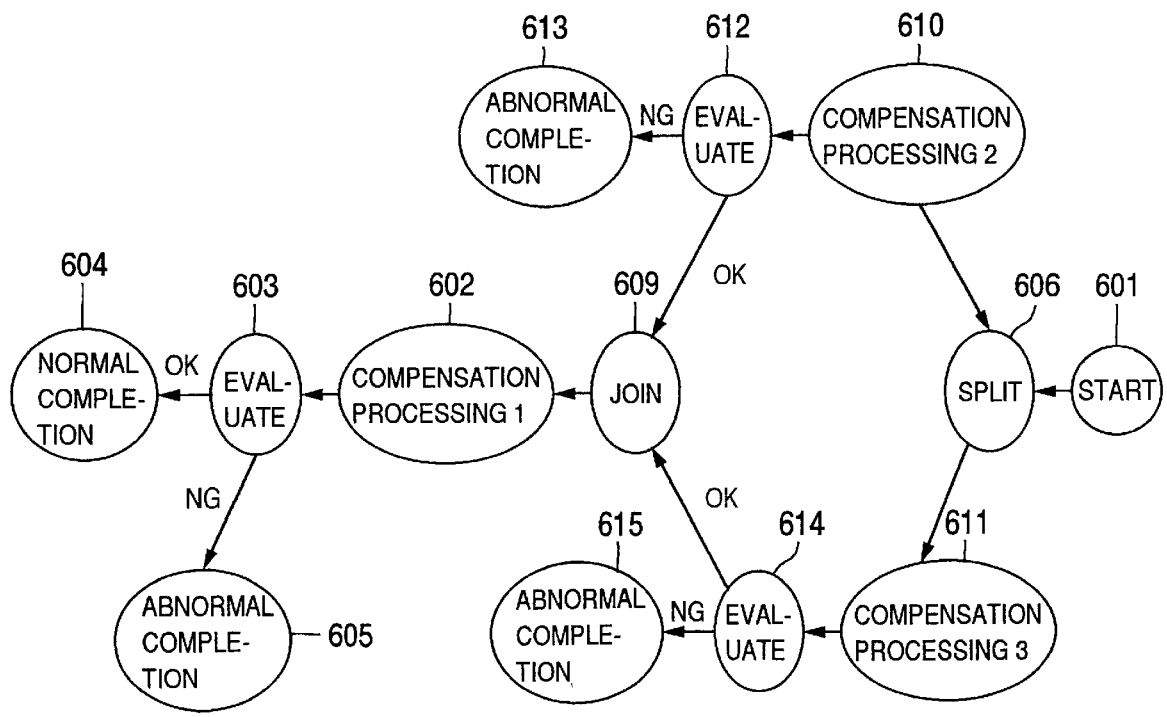
FIG. 9 is a diagram showing an example of the error recovery flow 120 according to the first embodiment.

FIG. 9 is a diagram showing an example of the error recovery flow 120 according to the embodiment of the invention. The error recovery flow 120 shown in FIG. 9 shows the state when both the transactions are processed completely.

Upon reception of a definition request from each transaction, the workflow defining program 117 replaces the NOP node by the definition requested transaction. In FIG. 9, compensation processing 2 (node 610) and compensation processing 3 (node 611) correspond to the compensation transactions for the transactions 2 and 3. The normal processing part 302 adds the compensation transactions together with evaluate nodes 612 and 614 and error nodes 613 and 615.

After both the transactions are completely processed as shown in FIG. 5, the workflow control program 111 evaluates both the transactions (nodes 507 and 508). If it is evaluated that the transactions are normally completed, a join process (node 509) is executed. If two evaluation processes (nodes 507 and 508) detect the normal completion of the two transactions, the workflow control program 111 executes the next transaction (node 512) after the join process. The operation to be executed after it is detected that one of the transactions 2 and 3 has been abnormally completed, will be described later.

At the transaction 4 (node 512), reply message processing for the channel 209 is defined. Similar to the transaction request processing program 301 shown in FIG. 3, the reply message processing program 115 is constituted of the normal processing part 302 and compensation transaction processing part 303. However, the operation is different from that of the normal processing part 302 and compensation transaction processing part 303 of the transaction request processing program. The workflow control program 111 launches the normal processing part 302 of the reply message processing program 115.

Figure 10:
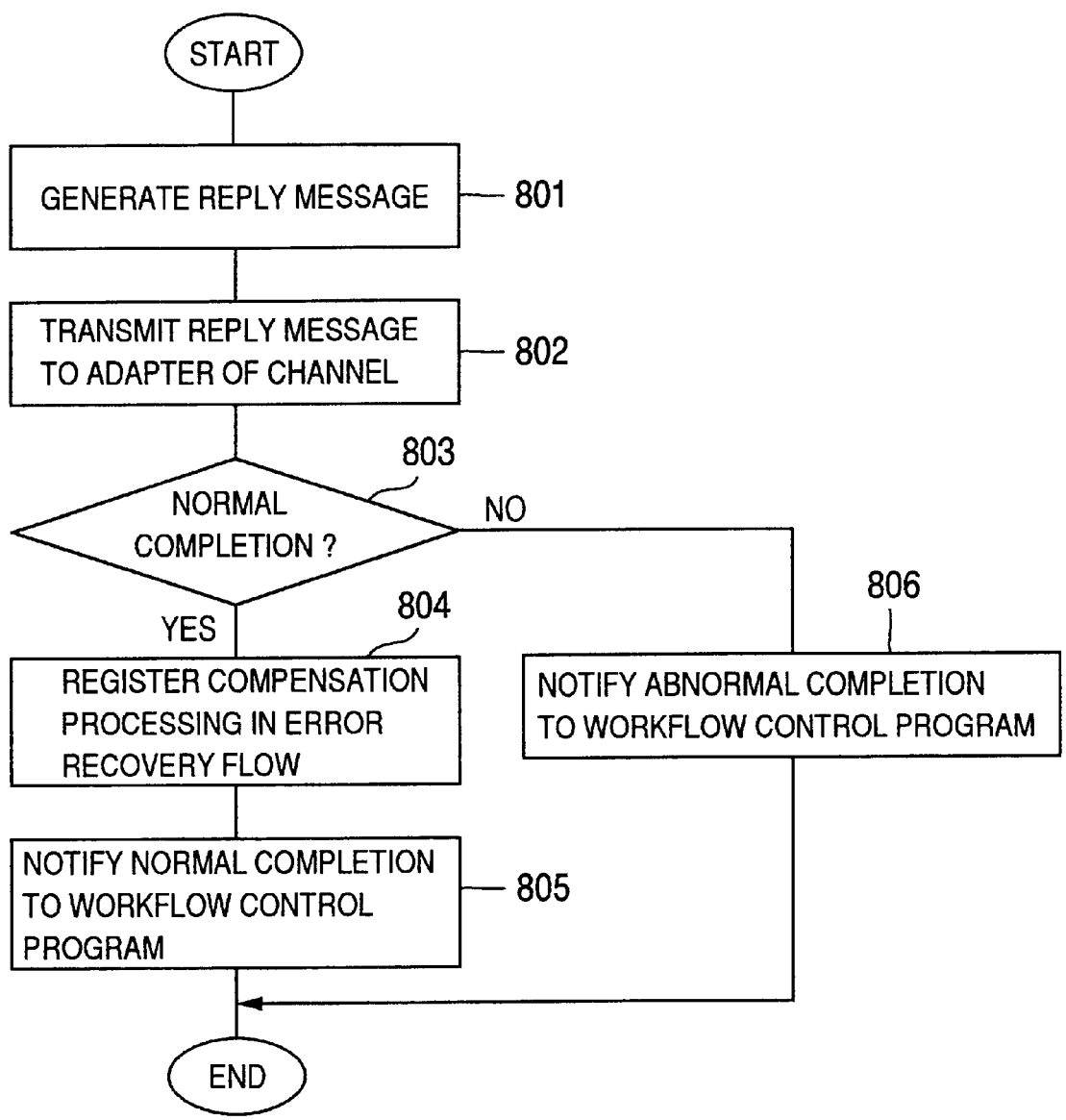
FIG. 10 is a flow chart illustrating the procedure of a reply message processing program 115 to be executed by the normal processing part 302 according to the first embodiment.

FIG. 10 is a flow chart illustrating the procedure of the reply message processing program 115 to be executed by the normal processing part 302 according to the embodiment. The normal processing part 302 executes the reply message processing program 115 in accordance with the procedure shown in FIG. 10. The operation of the reply message processing program 115 to be executed by the normal processing part 302 will be described with reference to FIG. 10.

The workflow control program 111 passes the request message sequential number 401 to the normal processing part 302 as its input. The normal processing part 302 reads the contents of the business process DB 110 at the row corresponding to the request message sequential number 401, generates a reply message to the channel 209 by using the read contents, and requests the sequential number management program 108 to assign the sequential number to the reply message (Step 801).

Next, the normal processing part 302 transmits the generated reply message to the adapter 103 (Step 802). The adapter 103 transmits the reply message to the channel 209 via the network 215.

Next, the normal processing part 302 evaluates whether the processing for the reply message has been completed normally (Step 803). If normally completed, the normal processing part 302 registers the reply message number 411 and reply message body 412 in the business process DB table 400, and registers a compensation transaction for aborting its processing for the reply message made by the normal processing part 302 in the error recovery flow 120 (Step 804). The normal processing part 302 notifies a normal completion to the workflow control program 111 (Step 805) to terminate the procedure. If it is evaluated at Step 803 that there is an error, the normal processing part notifies an abnormal completion to the workflow control program 111 (Step 806) to thereafter terminate the procedure.

After the transaction 4 is processed completely as shown in FIG. 5, the workflow control program 111 performs an evaluation process (node 513). If the evaluation results show the normal completion of the transaction 4, the workflow control program 111 terminates the procedure. The operation to be executed after the abnormal completion of the transaction 4 will be later described.

Figure 11A:
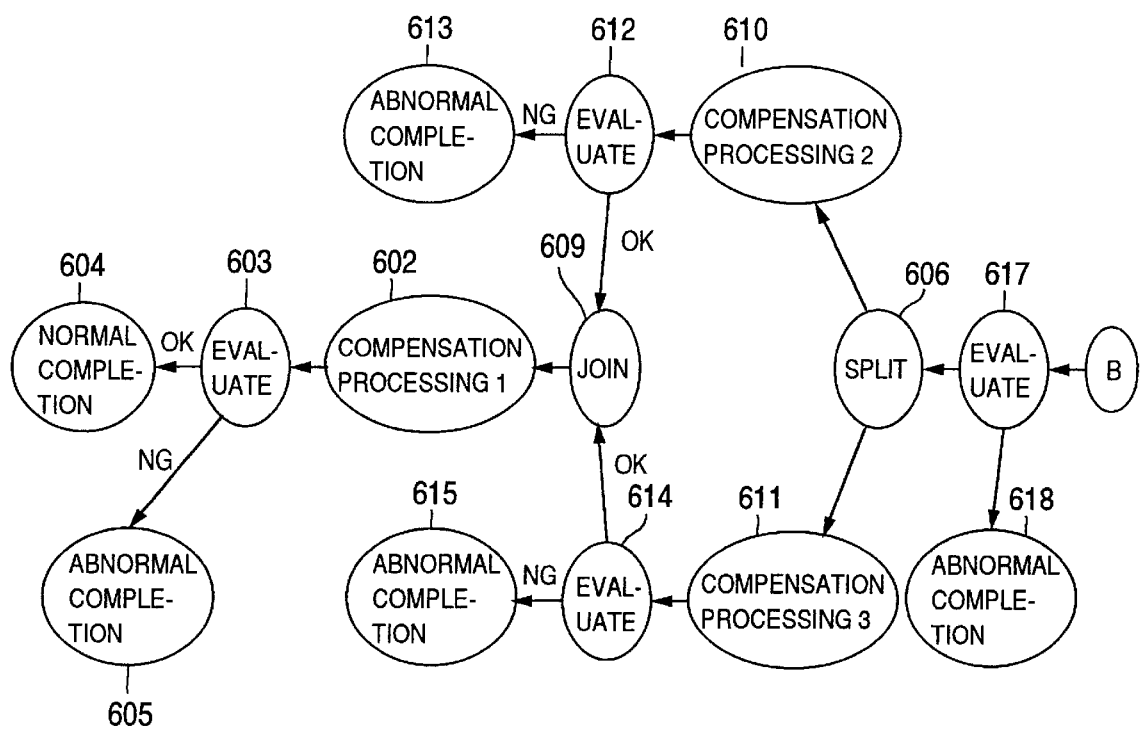
FIGS. 11A and 11B are diagrams showing an example of the error recovery flow according to the first embodiment.
Figure 11B:
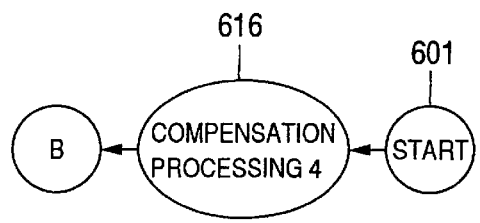

FIG. 11 is a diagram showing an example of the error recovery flow 120 according to the embodiment. The error recovery flow 120 shown in FIG. 11 shows the state when the transaction 4 (node 512) is processed completely. The reply message processing program 115 has compensation processing 4 (node 616), an evaluate node 617 and an error node 618.

The operation to be executed when the transaction is processed abnormally will be described. When an abnormal state of a transaction is detected at any of the evaluate nodes 502, 507, 508 and 513, the workflow control program 111 launches the error recovery program 116 (nodes 504, 510, 511 and 514).

At this time, the workflow control program passes the request message sequential number 401 to the error recovery program 116 as it input. The error recovery program 116 reads an ID of the error recovery flow 120 from the business process DB table 400 at the row corresponding to the input request message sequential number 401, and requests the workflow control program 111 to execute the error recovery flow 120. The error recovery program 116 passes the request message sequential number 401 and error recovery flow ID 404 to the workflow control program 111 at its inputs.

As shown in FIGS. 7 to 9 and FIG. 11, the error recovery flow 120 becomes different depending upon at which error recovery processing node in the normal processing flow 119 the error recovery program 116 was launched. Upon reception of a request from the error recovery program 116, the workflow control program 111 performs necessary processing in accordance with the error recovery flow 120 identified by the input error recovery flow ID 404, while launching the compensation transaction processing part 303. The compensation transaction processing part 303 has different procedures depending upon the transaction request processing programs 112 to 114 and reply message processing program 115.

Figure 12:
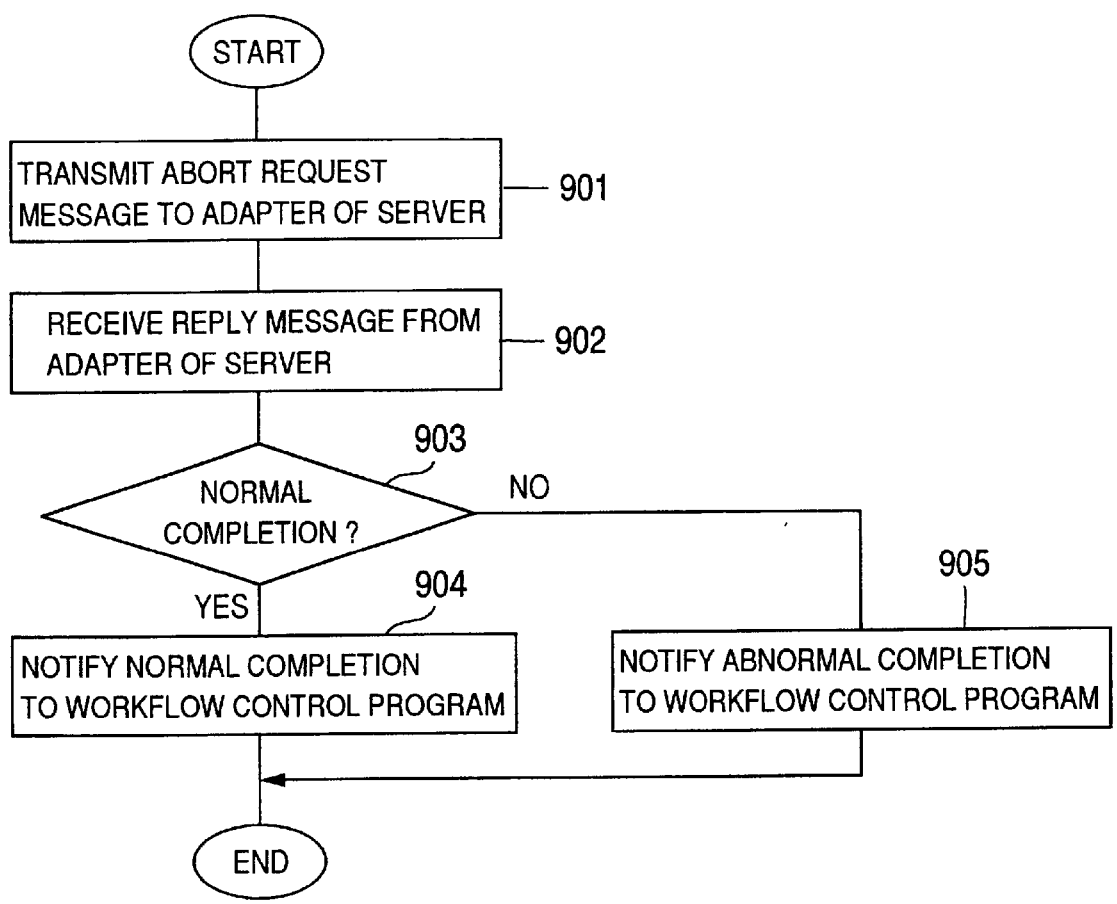
FIG. 12 is a flow chart illustrating the procedure of the transaction request processing programs 112 to 114 to be executed by a compensation transaction processing part 303 according to the first embodiment.

FIG. 12 is a flow chart illustrating the procedure of the transaction request processing programs 112 to 114 to be executed by the compensation transaction processing part 303 according to the embodiment. The procedure of the transaction request processing programs 112 to 114 to be executed by the compensation transaction processing part 303 will be described with reference to FIG. 12.

The workflow control program 111 passes the request message sequential number to the compensation transaction processing part 303 as its input. The compensation transaction processing part 303 reads the contents of the business process DB 110 at the row corresponding to the input request message sequential number 401, and performs necessary processing.

The compensation transaction processing part 303 reads the processing sequential numbers 405, 407 and 409 of the servers 210 to 212 and the data 406, 408 and 410 in the reply messages from the servers 210 to 212, generates messages for aborting the transactions, and transmits them to the adapters 104 to 106 (Sep 901).

In accordance with the abort request messages, the servers 210 to 212 abort the designated transactions and transmit the reply messages to the adapters 104 to 106. The compensation transaction processing part 303 receives the reply messages from the servers 210 to 212 (Step 902), and evaluates whether the abort process is completed normally (Step 903). If normally completed, a normal completion is notified to the workflow control program 111 (Step 904), whereas if not, an abnormal completion is notified to the workflow control program 111 (Step 905).

Figure 13:
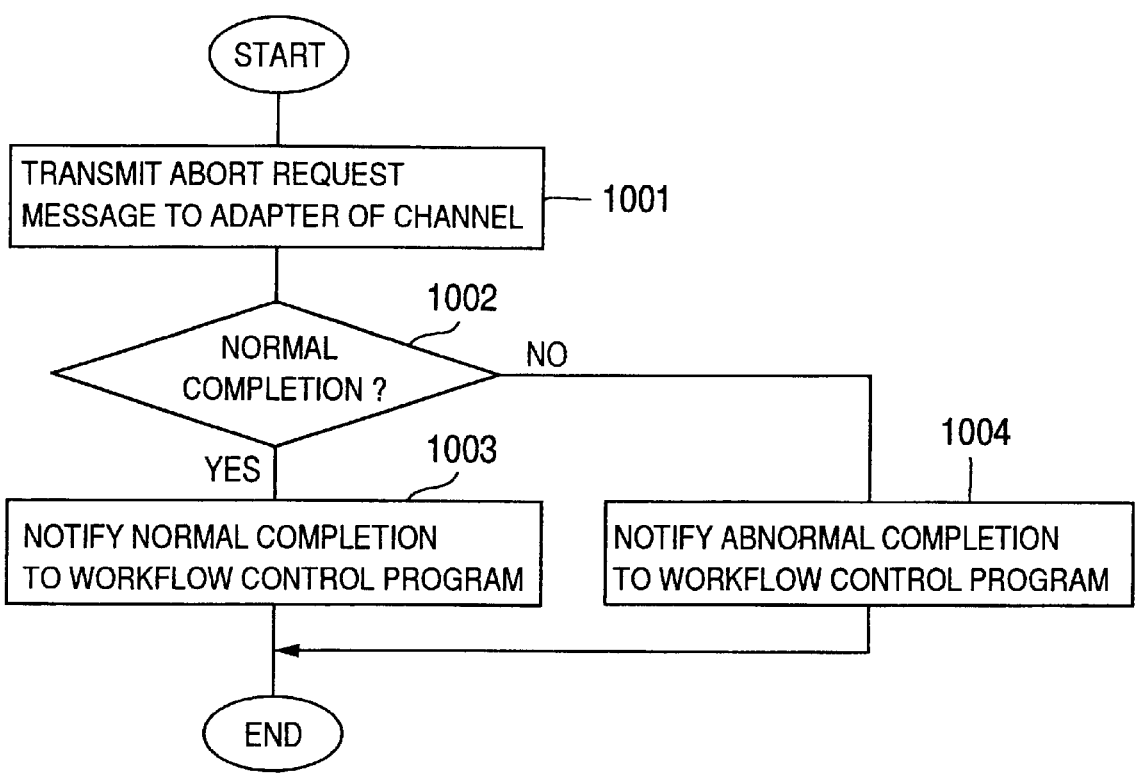
FIG. 13 is a flow chart illustrating the procedure of the reply message processing program 115 to be executed by the compensation transaction processing part 303 according to the first embodiment.

FIG. 13 is a flow chart illustrating the procedure of the reply message processing program 115 to be executed by the compensation transaction processing part 303 according to the embodiment. The compensation transaction processing part 303 executes the reply message processing program 115 by the procedure shown in FIG. 13. The procedure of the reply message processing program to be executed by the compensation transaction processing part 303 will be described with reference to FIG. 13.

Similar to the compensation transaction processing part 303 executing the transaction request processing programs 112 to 114, the workflow control program 111 passes the request message sequential number 401 to the compensation transaction processing part 303 as its input. The compensation transaction processing part 303 reads the contents of the business process DB 110 at the row corresponding to the input request message sequential number 401, and performs necessary processing. The compensation transaction processing part 303 reads the reply message sequential number 411 and reply message body 412 from the business process DB 110, generates a message for aborting the reply message, and transmits it to the adapter 103 (Step 1001).

Next, it is evaluated whether the transmission process is completed normally (Step 1002). If completed normally, a normal completion is notified to the workflow control program 111 (Step 1003), whereas if not, an abnormal completion is notified to the workflow control program 111 (Step 1004).

If it is evaluated that an abnormal completion has occurred at an evaluate node, the workflow control program 111 performs an abnormal completion processing. During the abnormal completion processing, the workflow control program 111 displays a message representative of the abnormal completion of the error recovery processing on the output device 214.

As described above, according to the embodiment, during the execution of the normal processing flow 119, the compensation transaction is registered in the error recovery flow 120 at each transaction. If an abnormal completion occurs at any transaction because of an error, the transactions executed until that time are recovered in accordance with the error recovery flow 120.

In this embodiment, if an abnormal completion of the compensation processing transaction occurs in the error recovery flow 120, the error recovery processing is terminated at this time. Instead, an error recovery flow 120 may be generated which executes the next compensation processing transaction irrespective of whether the normal or abnormal completion of the compensation processing transaction occurs. In this case, the normal processing part 302 registers only the compensation transaction in the error recovery flow 120, and does not register the evaluate node and error node.

The system administrator may request the workflow control program 111 to execute the error recovery flow 120, by using the input device 213 so that the error recovery processing can be executed at any time after the normal completion of the request message from the channel 209.

According to the embodiment, the workflow control system 201 can dynamically generate a workflow for the error recovery processing while a workflow having paths to be executed in parallel is executed. The workflow control program 111 can register the split and join processes in the error recovery flow 120 and can generate paths to be executed in parallel. When an error occurs, the error recovery processing can be executed in parallel for respective paths in accordance with the error recovery flow 120. It is therefore possible to shorten the error recovery time.

Since the workflow control system 201 manages the correspondence between request message sequential numbers 401 and error recovery flow IDs 404 by storing them in a database, the error recovery flow 120 corresponding to each request message from the channel 209 can be managed. Even if request messages are received at the same time from a plurality of channels, the error recovery processing for the request message relative to which an error has occurred can be executed.

As described above, in the transaction processing system of this embodiment, the error recovery processing is executed in parallel for respective paths generated by a split process in the normal processing flow. It is therefore possible to improve the efficiency of the error recovery processing.

According to the transaction processing system of this embodiment, each request message and information on the error recovery processing are managed in correspondence with each other. Therefore, even if the transaction processing system receives at the same time request messages from a plurality of channels, the error recovery processing can be executed efficiently.

2nd Embodiment

The transaction processing system of the second embodiment will be described in which the error recovery processing is performed in parallel for respective paths stored in a journal.

The object of this embodiment is to perform the error recovery processing in parallel for respective paths generated by a split process in the normal processing flow 119 in order to improve the efficiency of the error recovery processing, similar to the first embodiment. In the first embodiment, the transaction processing system generates the error recovery flow 120 and executes the error recovery processing by using the generated flow 120. In the second embodiment, the transaction processing system enqueues journal information and executes the error recovery processing in parallel by using the journal information. The hardware structure of the second embodiment is the same as that shown in FIG. 2.

Figure 14:
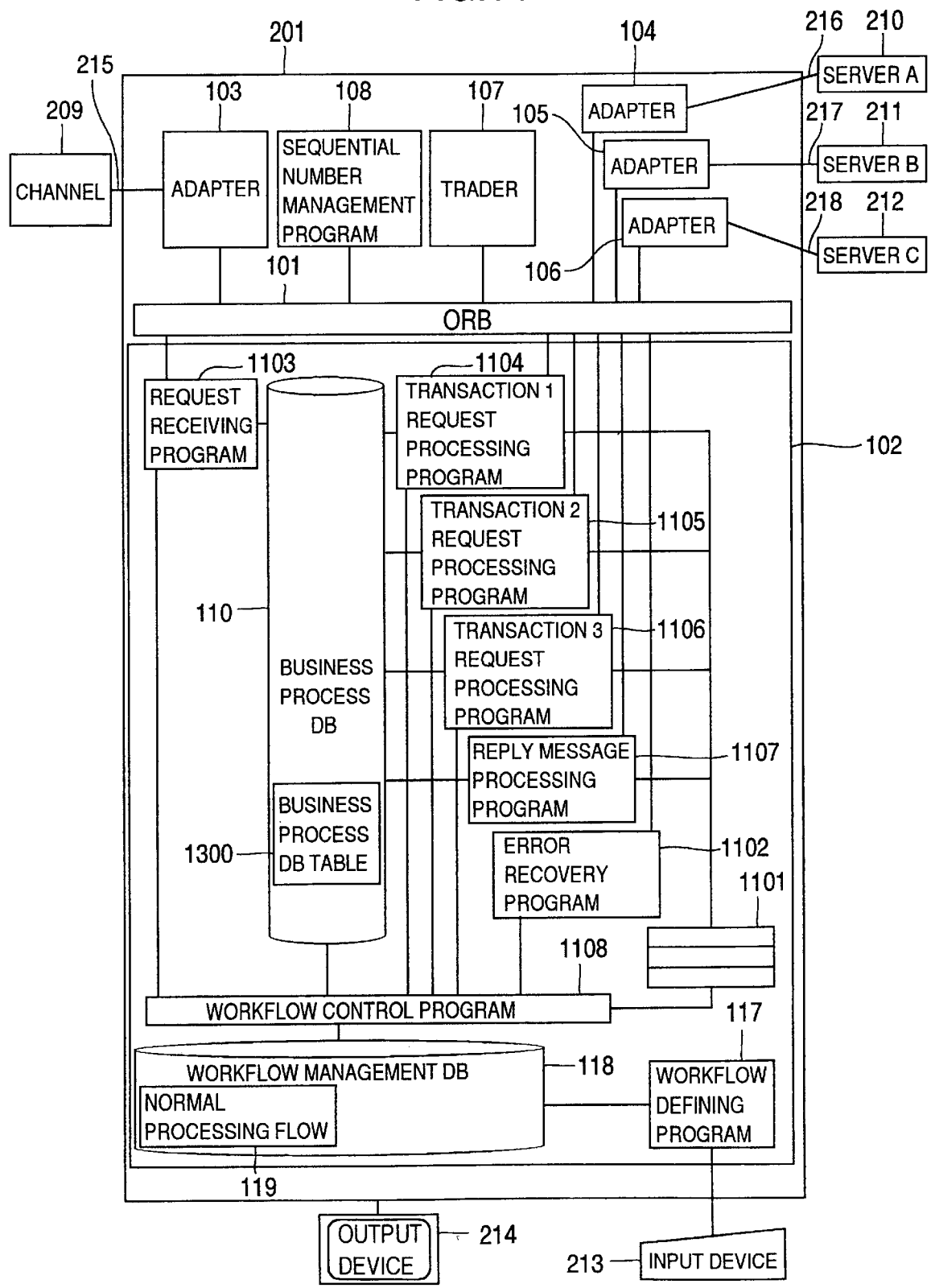
FIG. 14 is a block diagram showing the software structure of a transaction processing system according to a second embodiment of the invention.

FIG. 14 is a block diagram showing the software structure of the transaction processing system of the second embodiment. In this embodiment, the workflow execution program 102 is provided with a journal queue 1101. In this embodiment, since the error recovery flow 120 is not used for the error recovery processing, only the normal processing flow 119 is shown in the workflow management DB 118.

FIG. 15 shows an example of the business process DB table of the second embodiment. The business process DB 110 stores a business DB table 1300 such as shown in FIG. 15.

Each row of the business process DB table 1300 is constituted of a request message sequential number 1302, a request message body 1303, a normal processing flow ID 1304, and a queue ID 1301. The queue ID 1301 is used for identifying the journal queue 1101.

In this embodiment, the channel 209, servers 210 to 212, ORB 101, adapters 103 to 106, sequential number management program 108, and trader 107 perform processing similar to that of the first embodiment. In the following description, it is assumed that the normal processing flow 119 similar to that of the first embodiment shown in FIG. 5 is registered in the workflow management DB 118.

A request message from the channel 209 is processed by the adapter 103 by the procedure similar to that of the first embodiment, and transmitted to a request receiving program 1103.

Upon reception of the request message from the adapter 103, the request receiving program 1103 registers a request message sequential number 1302 and a request message body 1303 in the business process DB table 1300. In accordance with the contents of the request message, the normal processing flow 119 is determined, and the normal processing flow ID 1304 for identifying the normal processing flow 119 is registered. A queue ID 1301 for identifying the journal queue 1101 is generated and registered. A workflow control program 1108 is requested to execute the normal processing flow 119. At this time, the request receiving program 1103 passes the request message sequential number 1302 and normal processing flow ID 1304 to the workflow control program 1108 as its inputs.

The workflow control program 1108 reads the workflow identified by the normal processing flow ID 1304 from the normal processing flow 119 of the workflow management DB 118, and executes necessary processing in accordance with the read workflow.

Figure 16:
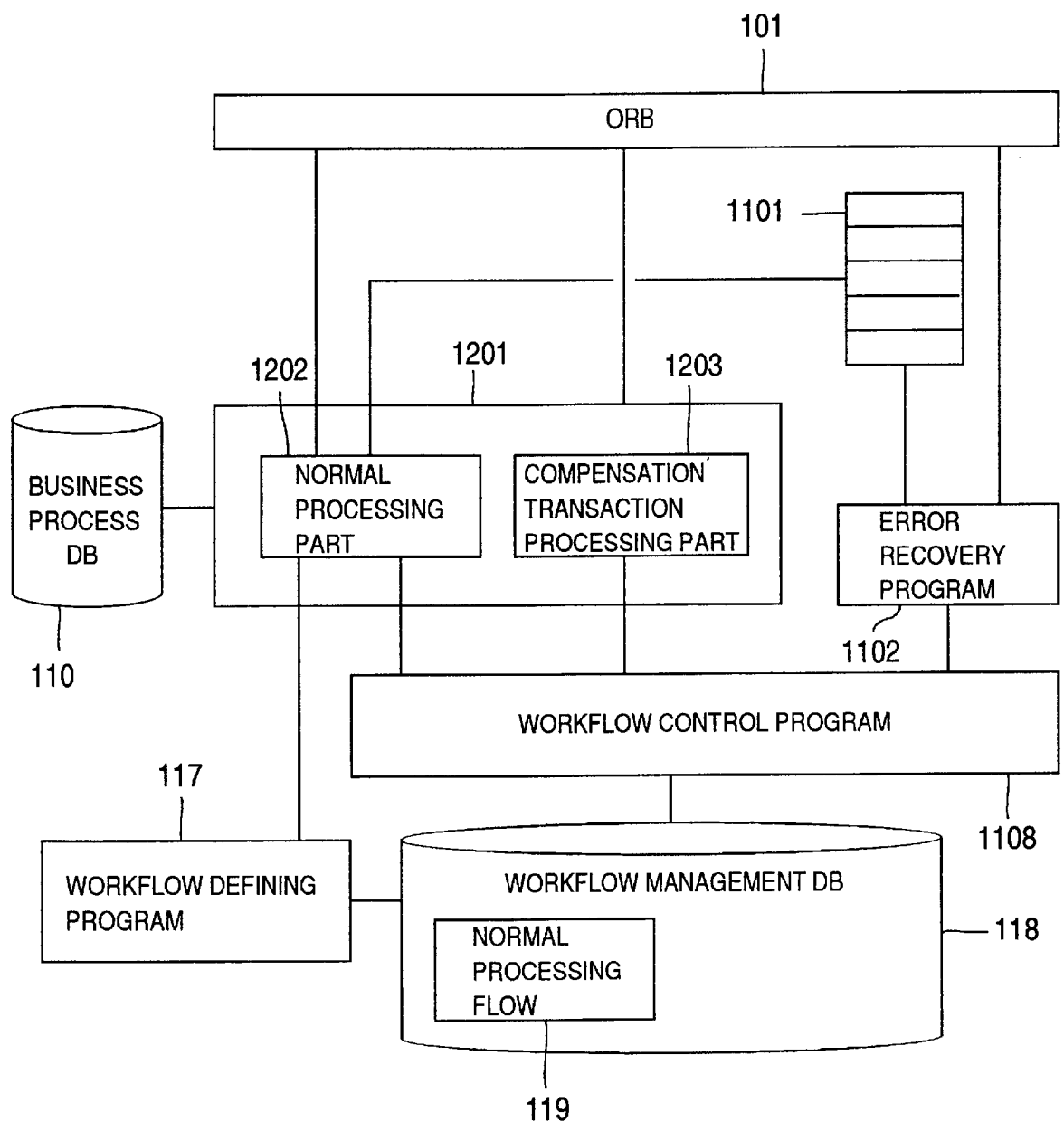
FIG. 16 is a schematic diagram illustrating the outline configuration of transaction request processing programs 1104 to 1106 and a reply message processing program 1107 according to the second embodiment.

FIG. 16 shows the outline configuration of transaction request processing programs 1104 to 1106 and reply message processing program 1107. As shown in FIG. 16, the workflow control system 201 of this embodiment has a normal processing part 1202 and a compensation transaction processing part 1203.

The normal processing part 1202 registers a journal representative of the contents of an executed transaction when the transaction is executed. When an error occurs during the execution of a transaction, the compensation transaction processing part 1203 reads the journal and executes in parallel the compensation transactions in accordance with the contents of the transactions registered in the journal queue.

A program for making the workflow control system 201 function as the normal processing part 1202 and compensation transaction processing part 1203 is assumed to be recorded in a recording medium such as a CD-ROM, loaded on a magnetic disk or the like, and then loaded on a memory to be executed. The recording medium for storing this program may be other medium different from CD-ROM.

A processing program 1201 shown in FIG. 16 includes the transaction request processing programs 1104 to 1106 and reply message processing program 1107 which are constituted of the normal processing part 1202 and compensation transaction processing part 1203.

In accordance with a definition, the workflow control program 1108 launches the normal processing part 1202 for the transaction request processing programs 1104 to 1106 and reply message processing program 1107. The workflow control program 1108 assigns an ID to each node in the workflow. For example, in the workflow shown in FIG. 5, the path containing the transaction 1 is managed by a path ID=A, the path containing the transaction 2 is managed by a path ID=B, the path containing the transaction 3 is managed by a path ID=C, and the path containing the transaction 4 is managed by a path ID=D. When the normal processing part 1202 is launched, the workflow control program 1108 passes the path ID to the normal processing part 1202 as the input parameter. The normal processing part 1202 stores the passed ID as a portion of the journal. The procedure of the normal processing part 1202 becomes different depending upon the transaction request processing programs 1104 to 1106 and reply processing program 1107.

Figure 17:
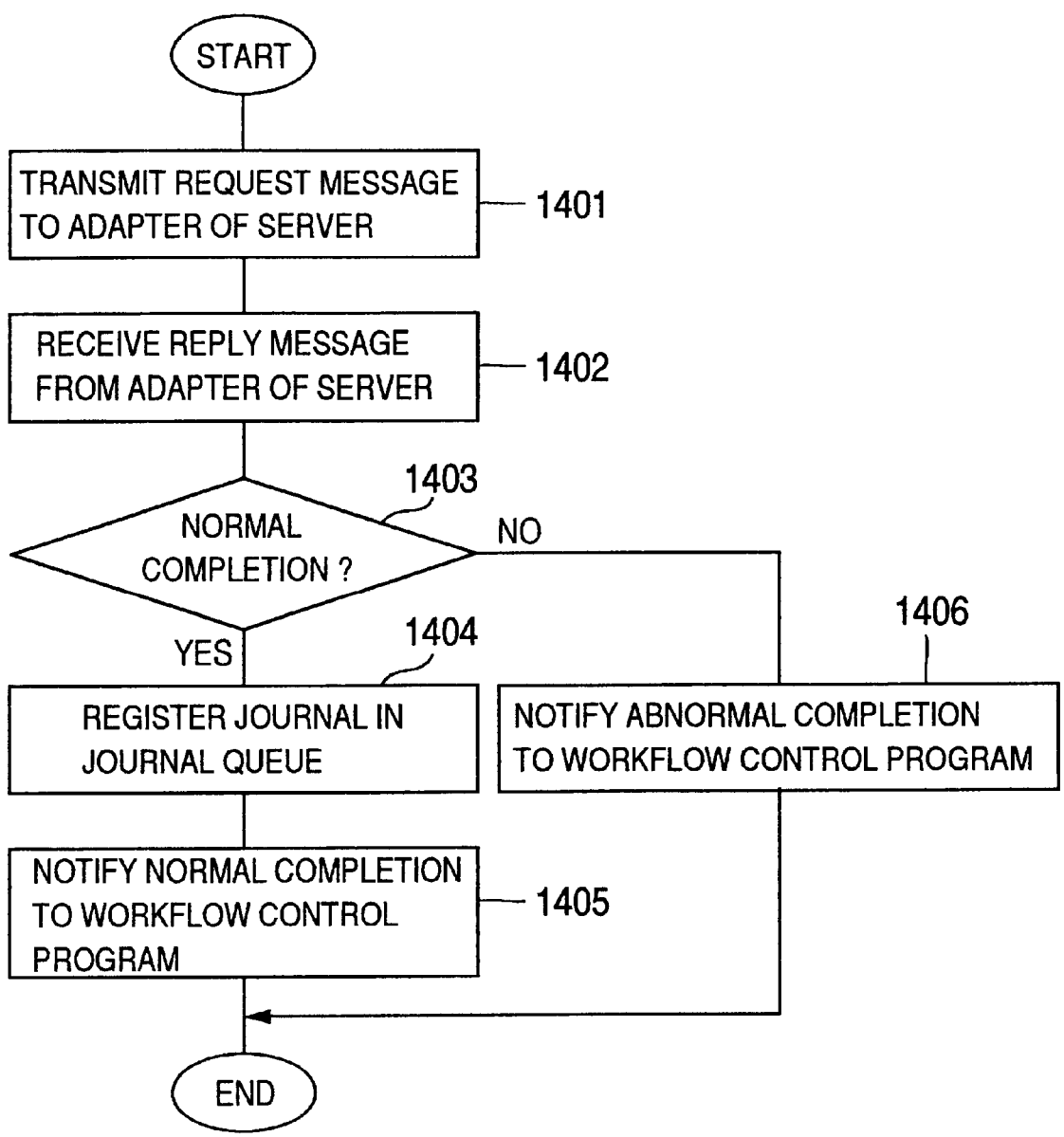
FIG. 17 is a flow chart illustrating the procedure of the transaction request processing programs 1104 to 1106 to be executed by a normal processing part 1202 according to the second embodiment.

FIG. 17 is a flow chart illustrating the procedure of the transaction request processing programs 1104 to 1106 to be executed by the normal processing part 1202 according to the embodiment. The normal processing part 302 for the transaction request processing programs 1104 to 1106 performs necessary processing in accordance with the procedure shown in FIG. 17. This procedure of the transaction request processing programs 1104 to 1106 to be executed by the normal processing part 1202 will be described with reference to FIG. 17.

The workflow control program 1108 passes the request message sequential number 1302 and path ID to the normal processing part 1202 as its inputs. The normal processing part 1202 for the transaction request processing programs 1104 to 1106 transmits the request message to the adapters 103 to 106 by the procedure similar to the first embodiment (Step 1401). After the transactions are processed at the servers 210 to 212, the normal processing part 1202 receives the reply messages from the adapters (Step 1402).

Next, the normal processing part 1202 evaluates whether the processing for the request message has been completed normally (Step 1403). If normally completed, the normal processing part 302 registers a journal of the transaction in the journal queue 1101 (Step 1404). A normal completion is notified to the workflow control program (Step 1405) to thereafter terminate the procedure. If the processing for the request message is not completed normally, the normal processing part 1202 notifies an abnormal completion to the workflow control program 1108 to thereafter terminate the procedure (Step 1406).

Figure 18:
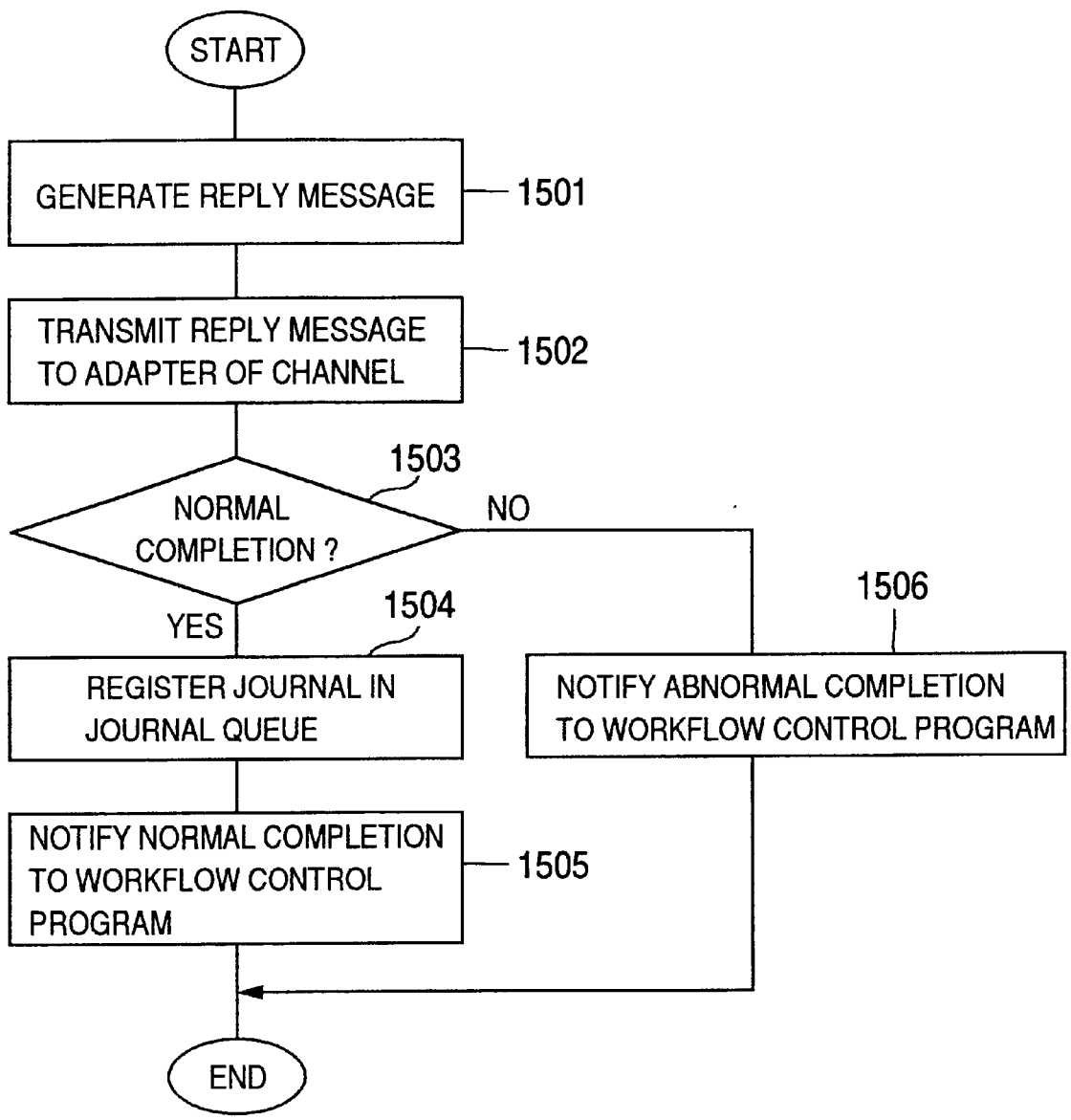
FIG. 18 is a flow chart illustrating the procedure of the reply message processing program 1107 according to the second embodiment.

FIG. 18 is a flow chart illustrating the procedure of the reply message processing program 1107 to be executed by the normal processing part 1202 according to the embodiment. The normal processing part 1202 executes the reply message processing program 1107 in accordance with the procedure shown in FIG. 18. The operation of the reply message processing program 1107 to be executed by the normal processing part 1202 will be described with reference to FIG. 18.

The workflow control program 1108 passes the request message sequential number 1302 and path ID to the normal processing part 1202 as its inputs. The normal processing part 1202 for the reply message processing program 1107 reads the contents of the business process DB 110 at the row corresponding to the request message sequential number 1302, generates a reply message to the channel 209 by using the read contents, and requests the sequential number management program 108 to assign the sequential number to the reply message (Step 1501). Next, the normal processing part 1202 transmits the generated reply message to the adapter 103 (Step 1502).

Next, the normal processing part 1202 evaluates whether the processing for the reply message has been completed normally (Step 1503). Next, a journal regarding the reply message processing is stored in the journal queue 1101 (Step 1504). A normal completion is notified to the workflow control program 1108 (Step 1505) to terminate the procedure. If it is evaluated that there is an error, an abnormal completion is notified to the workflow control program 1108 (Step 1506) to thereafter terminate the procedure.

FIG. 19 is a diagram showing an example of the contents of the journal queue according to the embodiment. The contents of the journal queue shown in FIG. 19 indicate those obtained after the normal processing flow 119 has been completed normally. The journal queue 1101 is of a first-in last-out type.

Journal information 1601, 1603 and 1604 shown in FIG. 19 is the journal information stored by the transaction request processing programs 1104 to 1106. Journal information 1606 is the journal information stored by the reply message processing program 1107. Journal information 1602 and 1605 is the journal information stored by the workflow control program 1108. Since the transactions 2 and 3 are executed in parallel, the order of the journal information 1603 on the transaction 2 and the journal information 1604 on the transaction 3 becomes different depending upon the timings when the normal processing for the transactions is terminated.

Each of the transaction request processing programs 1104 to 1106 stores at Step 1404 shown in FIG. 17: a processing ID for identifying each transaction request processing; a target ID for identifying the server to which a request message was transmitted; a processing sequential number assigned to each transaction by the servers 210 to 212; a path ID for identifying the path to which each transaction request processing was executed; and a journal constituted of data regarding the reply message body supplied from each server.

The reply processing program 1107 stores at Step 1504 shown in FIG. 18: a processing ID for identifying a reply message processing; a target ID for identifying the channel 209 to which a reply message was transmitted; a reply message sequential number assigned to the reply message; a path ID for identifying a path to which the reply message processing was executed; and a journal constituted of data regarding the reply message body.

The workflow control program 1108 stores the journal information in the journal queue when the split or join process is executed. The journal information on the split process is constituted of, as shown in the journal information 1602: a processing ID for identifying the split process; a path ID before split for identifying the path before split; and a path ID after split for identifying the path after split. The journal information on the join process is constituted of, as shown in the journal information 1605: a processing ID for identifying the join process; a path ID before join for identifying the path before join; and a path ID after join for identifying the path after split.

When an error occurs, the error recovery processing is executed by using the journal information stored as above. The workflow control program 1108 launches the error recovery program 1102 when an error occurs (nodes 504, 510, 511 and 514 in FIG. 5). At this time, the workflow control program 1108 passes the queue ID 1301 stored in the business DB table 1300 to the error recovery program 1102 as its input. The error recovery program 1102 acquires the journal information in the journal queue identified by the queue ID 1301 and performs necessary processing by the procedure shown in FIG. 20.

Figure 20:
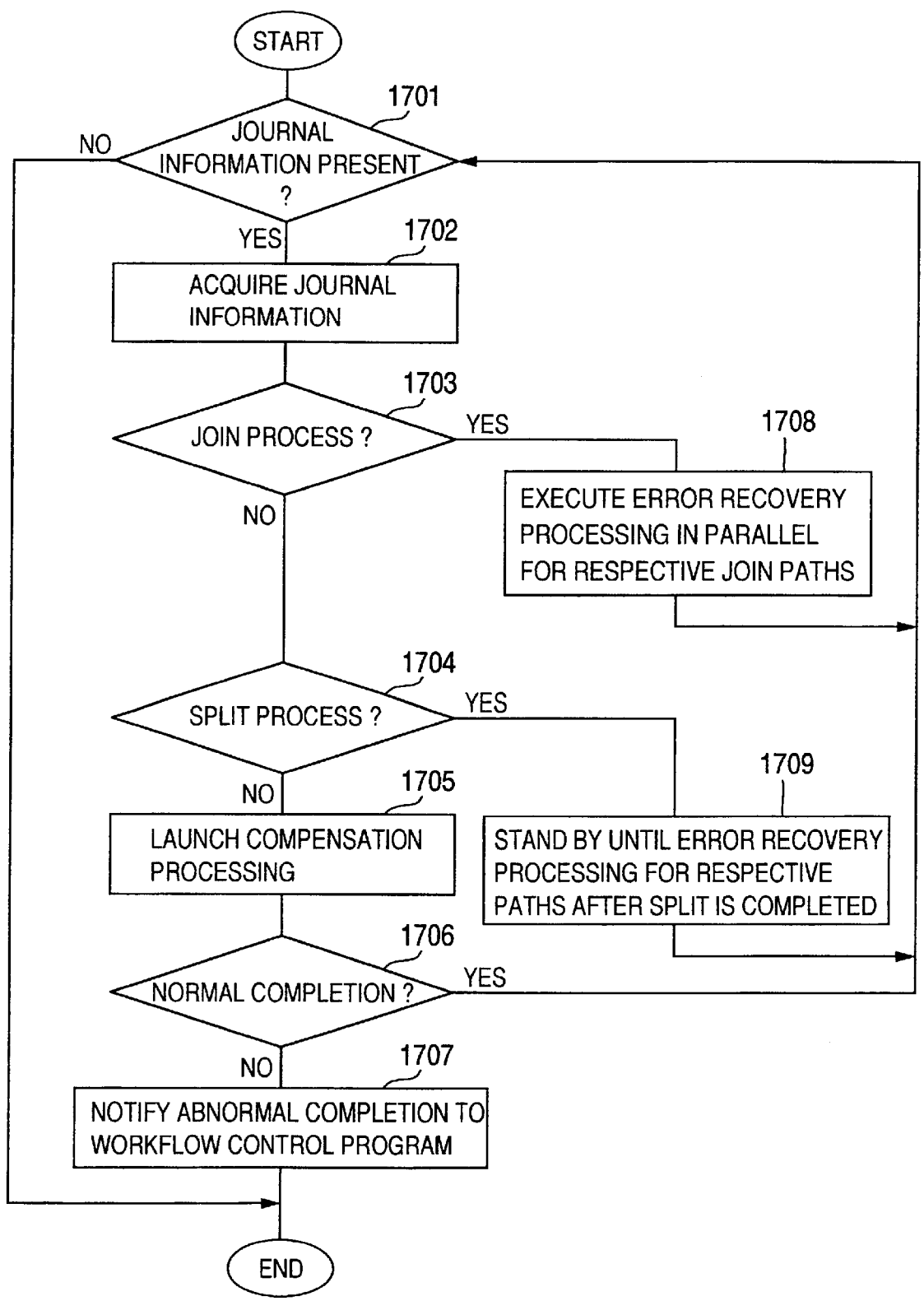
FIG. 20 is a flow chart illustrating the procedure of an error recovery program 1102 according to the second embodiment.

FIG. 20 is a flow chart illustrating the procedure of the error recovery program 1102 according to the embodiment. The procedure of the error recovery program 1102 will be described with reference to FIG. 20.

The error recovery program 1102 evaluates whether there is journal information in the journal queue identified by the queue ID 1301 (Step 1701). If not, the procedure is terminated, whereas if there is the journal information, it is acquired (Step 1702).

It is evaluated whether the acquired journal information is the information on the join process (Step 1703). If not, it is evaluated whether the acquired journal information is the information on the split process (Step 1704). If not, i.e., if the acquired information is the information on either the transaction request processing or the reply message processing, the compensation transaction processing part identified by the processing ID is launched (Step 1705).

Next, it is evaluated whether the compensation processing has been completed normally (Step 1706). If completed normally, the procedure returns to Step 1701 to continue the procedure. If completed abnormally, an abnormal completion is notified to the workflow control program 1108 to thereafter terminate the procedure (Step 1707).

If the journal information acquired from the journal queue 1101 is the information on the join process, the error recovery processing is executed in parallel for respective join path IDs (Step 1708). This can be realized, for example, by generating new threads and acquiring the journal information from the same journal queue by using a plurality of threads. If the acquired journal information is the information on the split process, the procedure stands by until the error recovery processing executed in parallel for respective paths generated by the split process is completed (Step 1709). This can be realized, for example, by waiting for a completion of a plurality of launched threads.

The procedure to be executed by the compensation transaction processing part 1203 to be launched by the procedure of the error recovery program 1102 described above, will be described with reference to FIGS. 21 and 22. The compensation transaction processing part 1203 operates differently depending upon the transaction request processing programs 1104 to 1106 and reply message processing program 1107.

Figure 21:
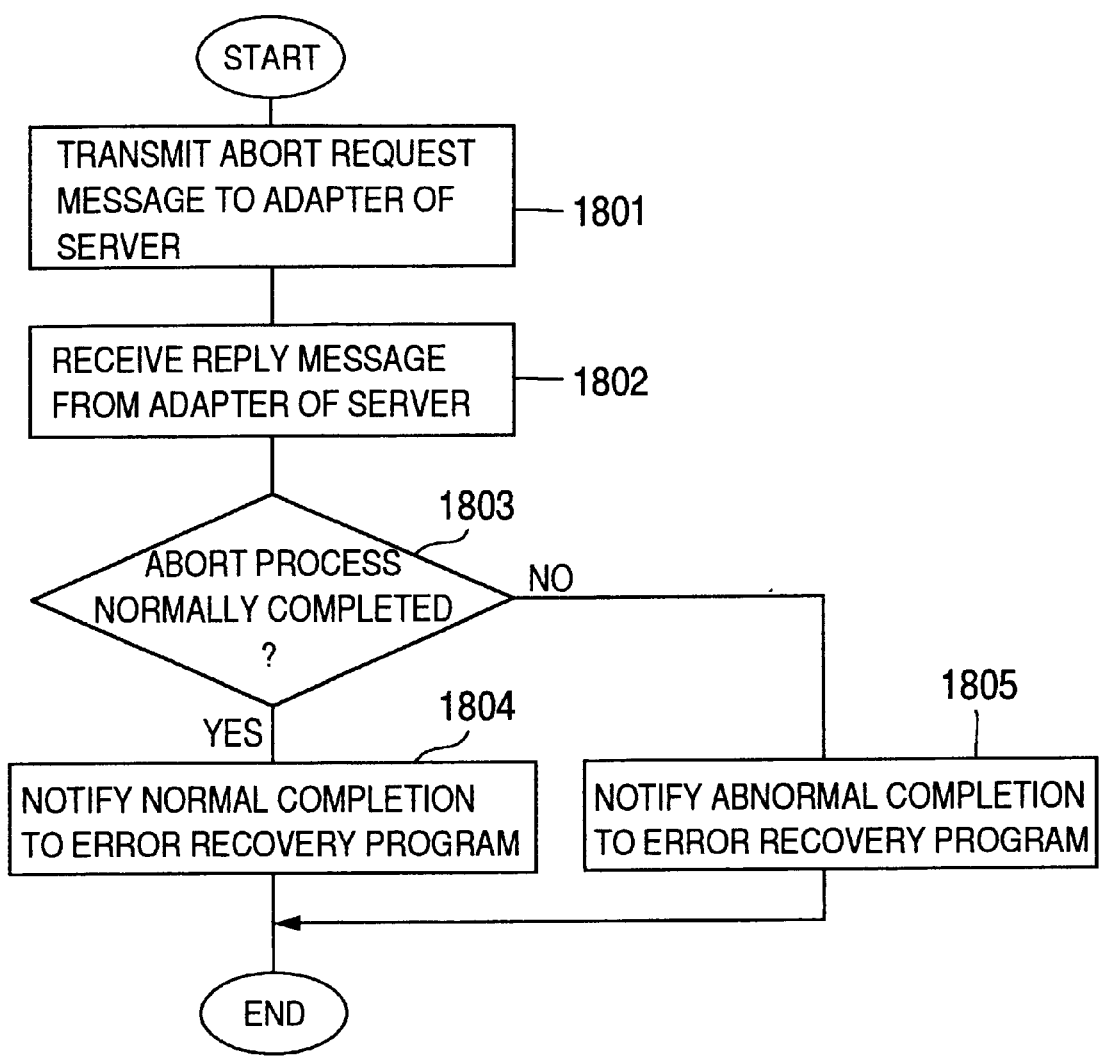
FIG. 21 is a flow chart illustrating the procedure of the transaction request processing programs 104 to 1106 to be executed by a compensation transaction processing part 1203 according to the second embodiment.

FIG. 21 is a flow chart illustrating the procedure of the transaction request processing programs 1104 to 1106 to be executed by the compensation transaction processing part 1203 according to the embodiment. First, the procedure of the transaction request processing programs 1104 to 1106 to be executed by the compensation transaction processing part 1203 will be described with reference to FIG. 21.

The error recovery program 1102 passes the journal information acquired from the journal queue 1101 to the compensation transaction processing part 1203 as its input. The compensation transaction processing part 1203 generates a message for aborting the processing corresponding to the processing sequential number by using the acquired journal information, and transmits the abort request message to the adapter 104–106 connected to the server 210–212 identified by the target ID (Step 1801).

Next, a reply message for the abort process executed by the server 210–212 is received from the adapter 104–106 (Step 1802). It is then evaluated whether the abort process has been completed normally (Step 1803). If completed normally, a normal completion is notified to the error recovery program 1102 to thereafter terminate the procedure (Step 1804). If the abort process is not completed normally, an abnormal completion is notified to the error recovery program 1102 to thereafter terminate the procedure (Step 1805).

Figure 22:
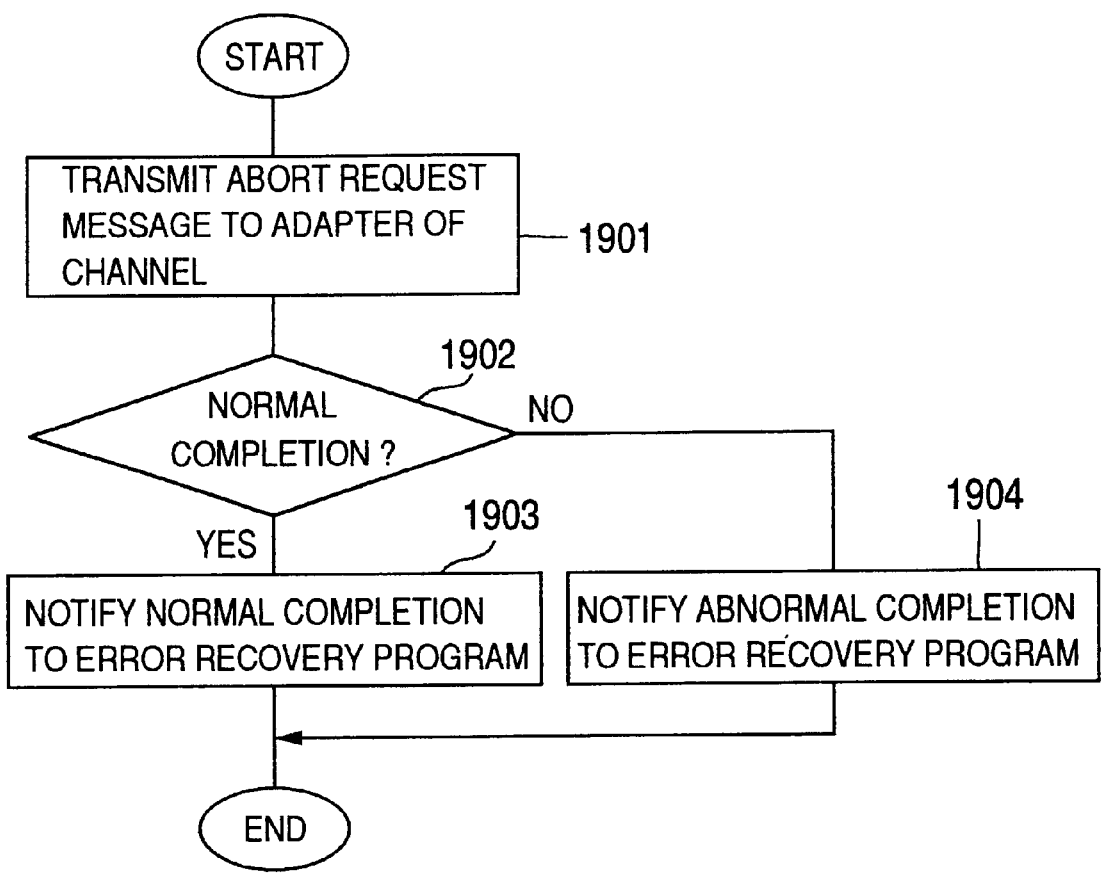
FIG. 22 is a flow chart illustrating the procedure of the reply message processing program 1107 to be executed by the compensation transaction processing part 1203 according to the second embodiment.

FIG. 22 is a flow chart illustrating the procedure of the reply message processing program 1107 to be executed by the compensation transaction processing part 1203 according to the embodiment. Next, the procedure of the reply message processing program 1107 to be executed by the compensation transaction processing part 1203 will be described with reference to FIG. 22.

The error recovery program 1102 passes the journal information acquired from the journal queue 1101 to the compensation transaction processing part 1203 as its input. The compensation transaction processing part 1203 generates a message for aborting the processing corresponding to the processing sequential number by using the acquired journal information, and transmits the abort request message to the adapter 103 connected to the server 209 identified by the target ID (Step 1901).

Next, it is evaluated whether the transmission process for the abort request message process has been completed normally (Step 1902). If completed normally, a normal completion is notified to the error recovery program 1102 to thereafter terminate the procedure (Step 1903). If not completed normally, an abnormal completion is notified to the error recovery program 1102 to thereafter terminate the procedure (Step 1904).

As described above, according to the embodiment, the normal processing part 1202 registers the journal information including the path ID in the journal queue 1101, and the workflow control program 1108 stores the journal information on the split and join processes in the journal queue 1101. When an error occurs, the workflow control system 201 can execute the error recovery processing in parallel for respective paths, by using the journal information stored in the journal queue 1101. It is therefore possible to shorten the time required for the error recovery processing.

Since the workflow control system 201 manages the correspondence between request message sequential numbers 1301 and journal queues 1101 by storing then in a database, the journal queue corresponding to each request message from the channel 209 can be managed. Even if request messages are received at the same time from a plurality of channels, the error recovery processing for the request message relative to which an error has occurred can be executed.

In this embodiment, although the journal queue 1101 and business process DB 110 are provided discretely, a journal information storing table may be formed in the business process DB 110. The system administrator may launch the error recovery program 1102 by using the input device 213 so that the error recovery processing can be executed at any time after the normal completion of the request message from the channel 209.

As described above, in the transaction processing system of this embodiment, the error recovery processing is executed in parallel for respective paths relative to which the workflow control system executed the normal processing. It is therefore possible to improve the efficiency of the error recovery processing.

3rd Embodiment

The transaction processing system of the third embodiment will be described in which the error recovery processing is executed in parallel in accordance with the contents of transactions contained in the journal information.

In the second embodiment, in order to improve the efficiency of the error recovery processing, the error recovery processing is executed in parallel for respective parallel paths in the normal processing flow 119. At each path, the error recovery processing for each transaction is executed in the reverse order of that during the normal processing. However, depending upon business logic to be processed by the transaction processing system, the order of transactions during the error recovery processing is not necessary to be cared. In this embodiment, in order to improve the efficiency of the error recovery processing for such a transaction processing system, the error recovery processing is executed in parallel in accordance with the contents of each transaction contained in the journal information. The hardware and software structures of this embodiment are assumed to be the same as those of the second embodiment.

Figure 23:
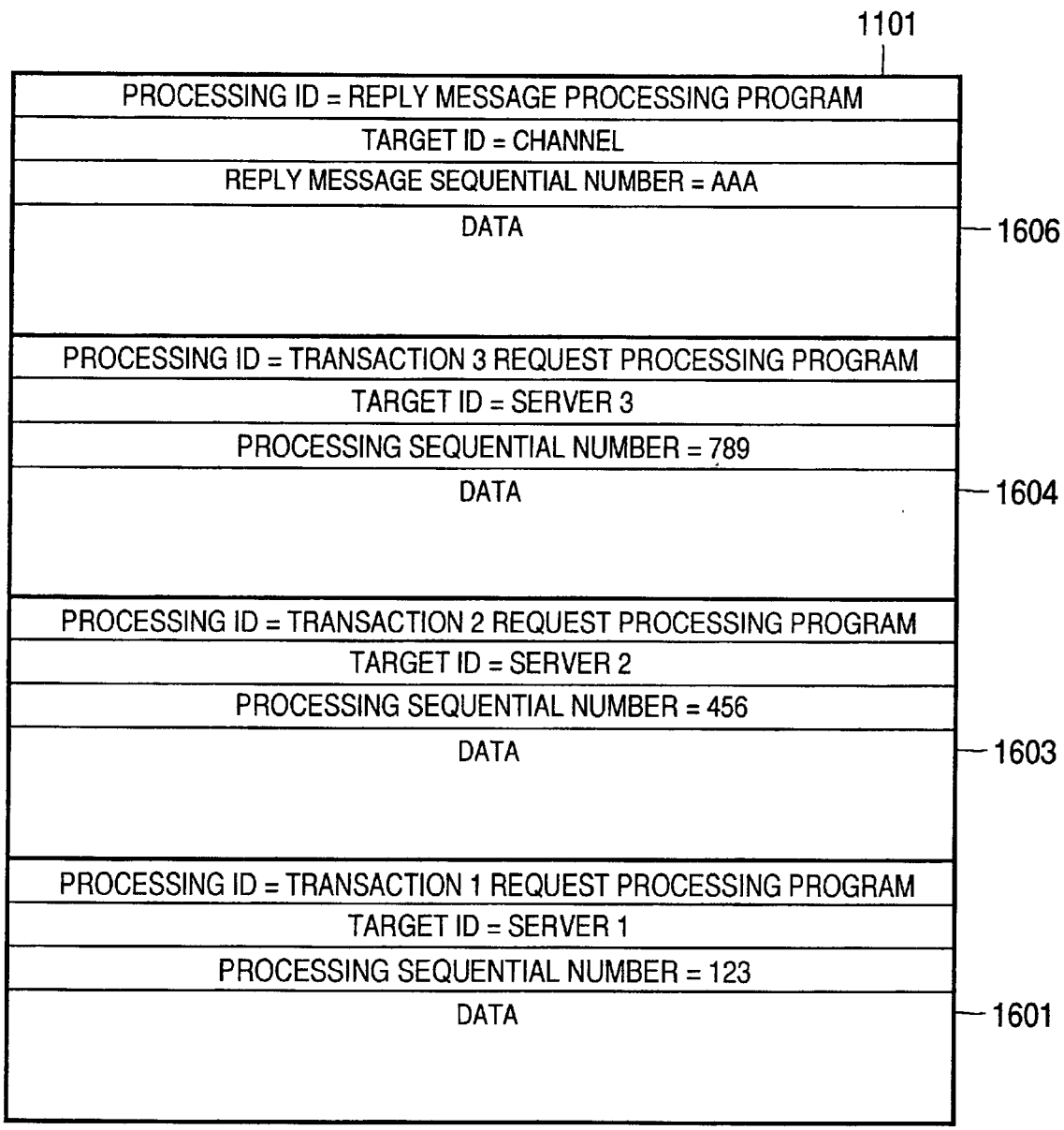
FIG. 23 is a diagram showing an example of the contents of a journal queue 1101 according to a third embodiment of the invention.

FIG. 23 shows an example of the contents of the journal queue 1101 of this embodiment. The workflow control program 1108 of this embodiment does not store journal information in the journal queue for the split and join processes. The normal processing program 1202 for the transaction request processing programs 1104 to 1106 and reply processing program 1107 is not required to store the path ID when the journal information is stored.

Figure 24:
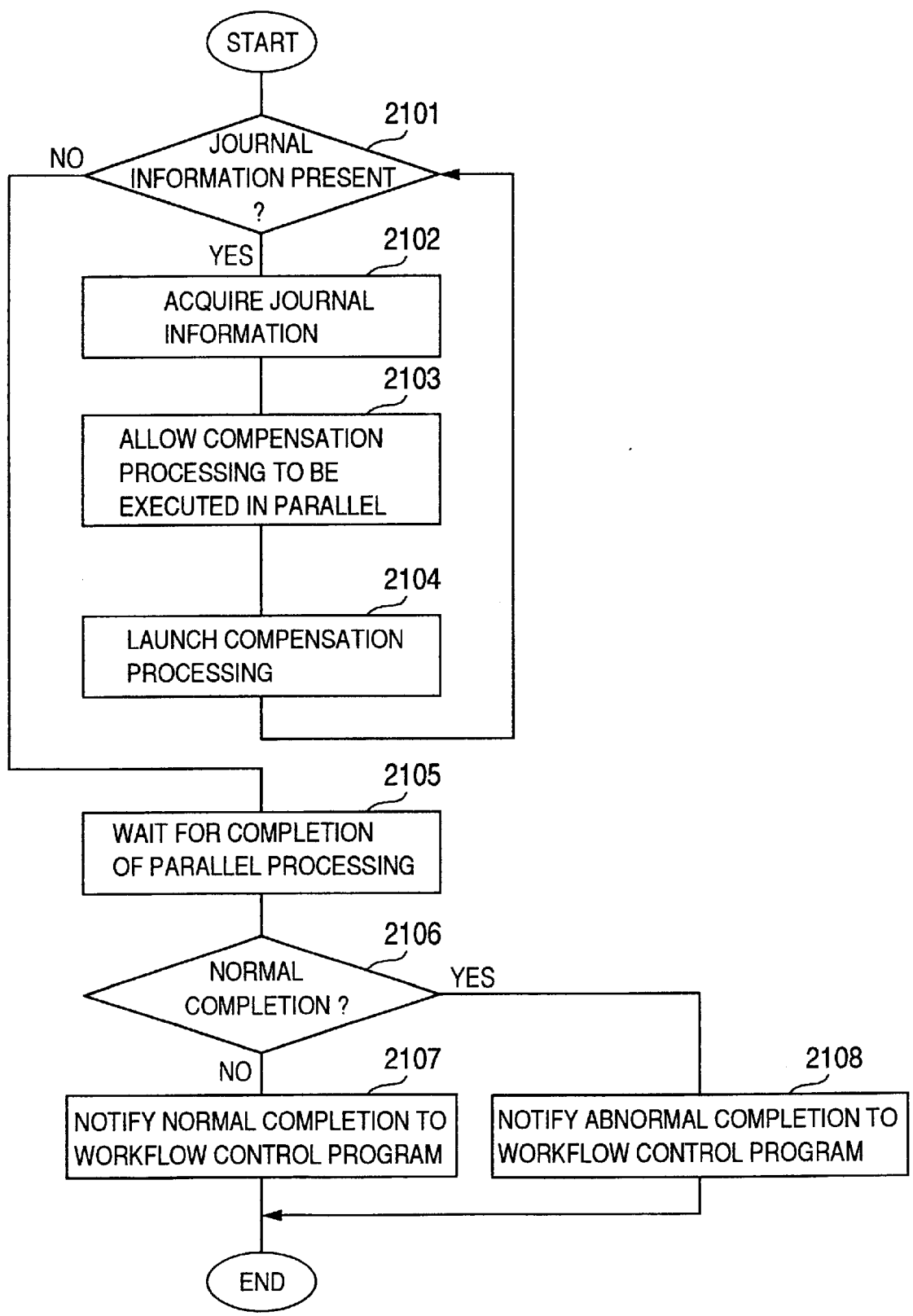
FIG. 24 is a flow chart illustrating the procedure of an error recovery program 1102 according to the third embodiment.

FIG. 24 is a flow chart illustrating the procedure of the error recovery program 1102 according to the embodiment. Next, the procedure of the error recovery program 1102 of this embodiment will be described with reference to FIG. 24.

The workflow control program 1108 passes the queue ID 1301 stored in the business process DB table 1300 to the error recovery program 1102 at its input. When the error recovery program 1102 is launched by the workflow control program 1108, it evaluates whether there is journal information in the journal queue 1101 (Step 2101). If there is the journal information, it is acquired (Step 2102).

Next, threads for processing the acquired journal information are generated to allow the compensation processing to be executed in parallel (Step 2103). The compensation transaction processing part 1203 is launched for the newly generated threads (Steep 2104). The above processes are repeated so long as the journal information is stored in the journal queue 1101, and when there is no journal information, a completion of parallel threads is waited for (Step 2105).

Next, it is evaluated whether the compensation processing has been completed normally (Step 2106). If the whole of the compensation processing has been completed normally, a normal completion is notified to the workflow control program 1108 to thereafter terminate the procedure (Step 2107). If any of the compensation processing is completed abnormally, an abnormal completion is notified to the workflow control program 1108 to thereafter terminate the procedure (Step 2108).

According to this embodiment, it is possible to execute the compensation processing in parallel in accordance with the contents of each transaction registered in the journal information. The number of threads generated at Step 2103 may be memorized in order not to generate the threads in excess of a predetermined number.

As described above, in the transaction processing system of this embodiment, the error recovery processing is executed in parallel in accordance with the contents of each transaction registered in the journal information. It is therefore possible to improve the efficiency of the error recovery processing.

4th Embodiment

The transaction processing system of the fourth embodiment will be described in which the error recovery processing is executed in parallel in accordance with the target destination of each message registered in the journal information.

In this embodiment, in order to improve the efficiency of the error recovery processing, the error recovery processing is executed in parallel in accordance with the target destination of each message supplied from the workflow control system 201. To this end, the error recovery program 1102 judges the target ID to execute the error recovery processing in parallel in accordance with the target ID.

The hardware and software structures of this embodiment are the same as those of the second and third embodiments. In this embodiment, the contents of the journal information stored in the journal queue are the same as those of the third embodiment.

Figure 25:
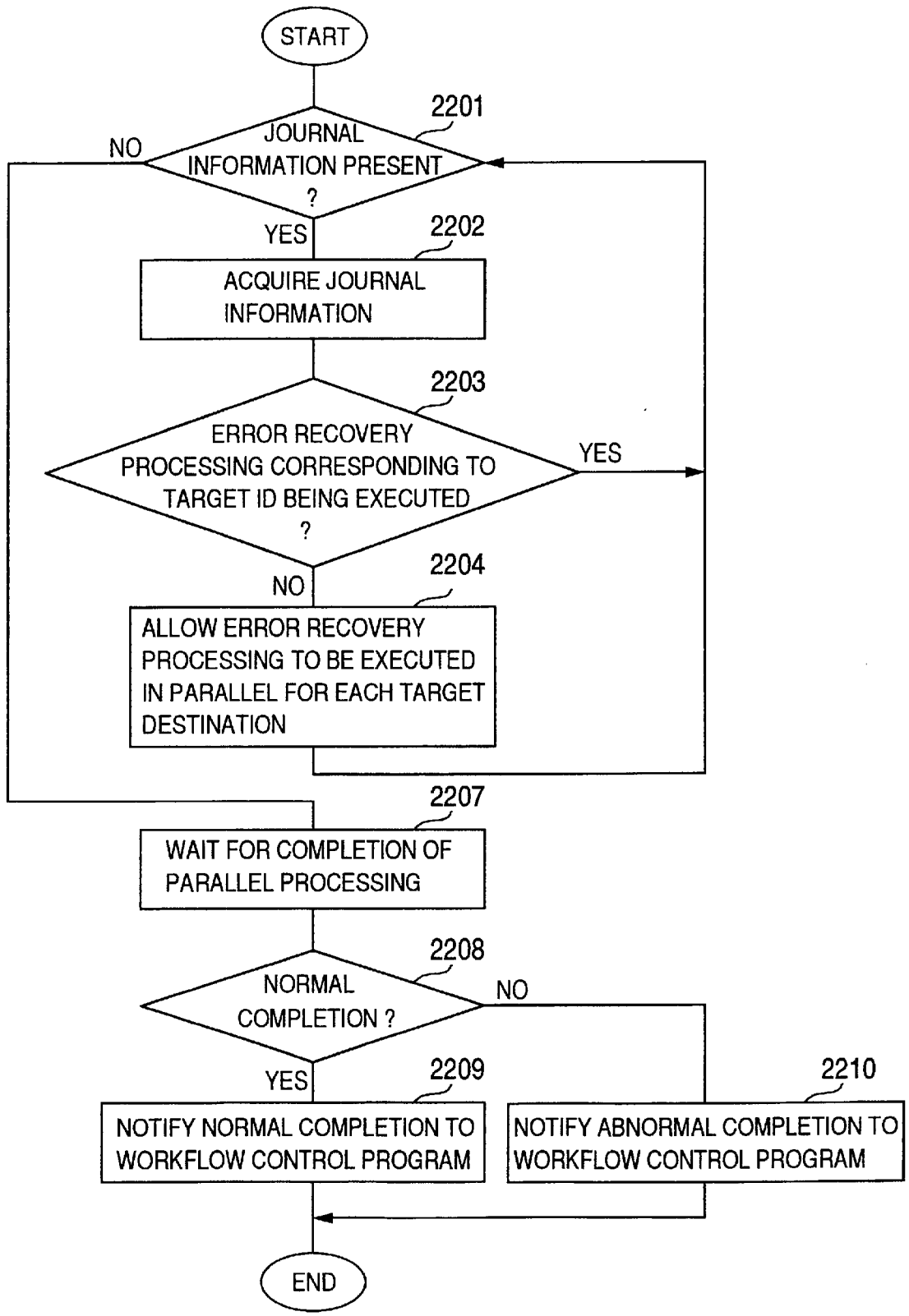
FIG. 25 is a flow chart illustrating the procedure of an error recovery program 1102 according to a fourth embodiment of the invention.

FIG. 25 is a flow chart illustrating the procedure of the error recovery program 1102 according to the embodiment. The procedure of the error recovery program 1102 of this embodiment will be described with reference to FIG. 25.

The workflow control program 1108 passes the queue ID 1301 stored in the business process DB table 1300 to the error recovery program 1102 as its input. The error recovery program 1102 evaluates whether there is journal information in the journal queue 1101 (Step 2201). If there is the journal information, it is acquired (Step 2202).

Next, it is evaluated whether the error recovery processing corresponding to the target ID is being executed (Step 2203). If not, threads for executing the error recovery processing corresponding to the target ID are generated, and by using the newly generated threads, the error recovery processing for the target ID is executed (Step 2204).

If the error recovery processing corresponding to the target ID in the acquired journal information is being executed, the procedure returns to Step 2201 to execute necessary processing for the next journal information. If it is judged at Step 2201 that there is no next journal information in the journal queue 1101, a completion of the threads is waited for (Step 2207), and then it is evaluated whether the whole of the error recovery processing has been completed normally (Step 2208). If completed normally, a normal completion is notified to the workflow control program 1108 to thereafter terminate the procedure (Step 2209). If any of the error recovery processing has been completed abnormally, an abnormal completion is notified to the workflow control program 1108 to thereafter terminate the procedure (Step 210).

Figure 26:
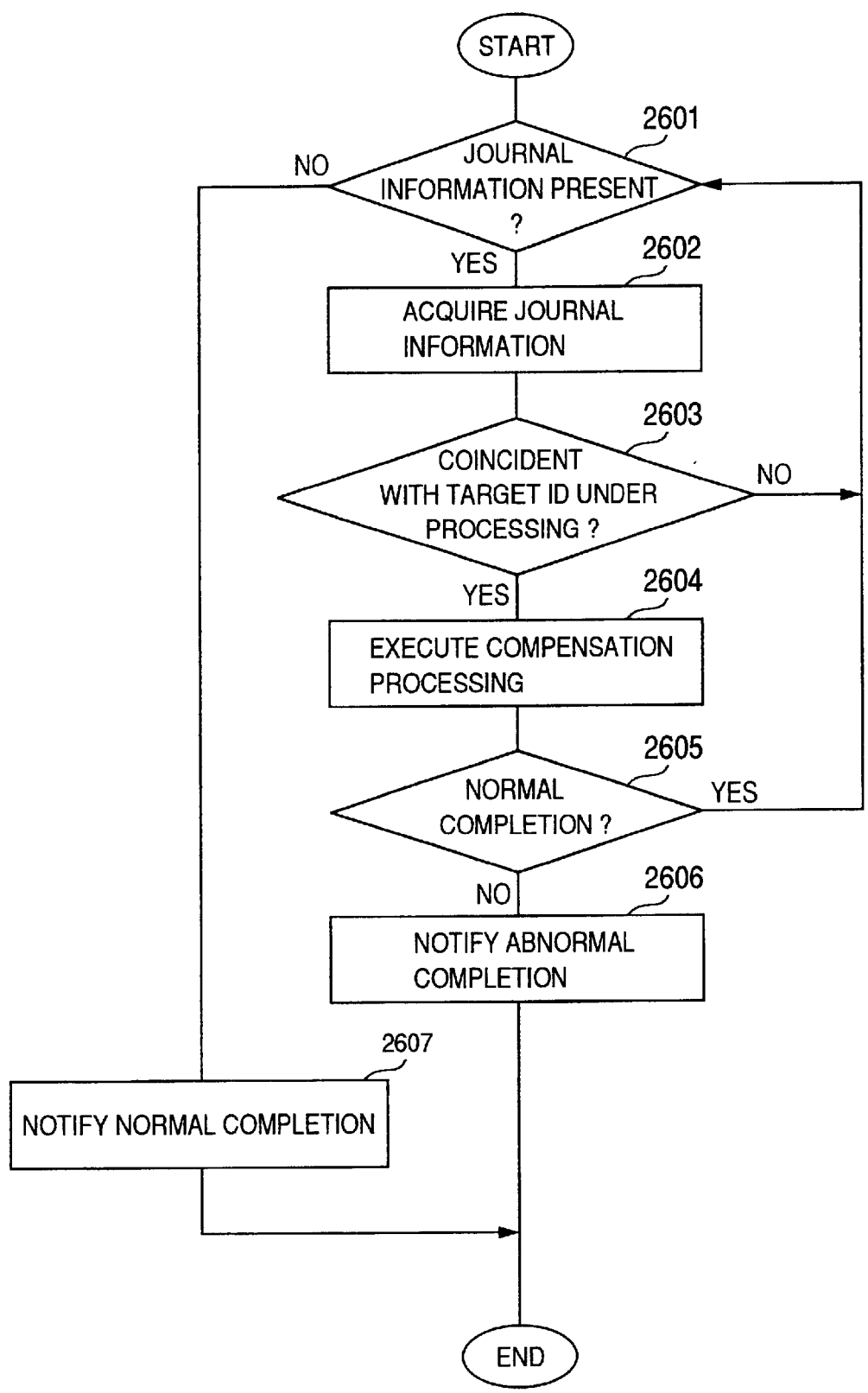
FIG. 26 is a flow chart illustrating the procedure of Step 2204 of forming a thread according to the fourth embodiment.

FIG. 26 is a flow chart illustrating the procedure to be executed by a thread generated at Step 2204 according to the embodiment. The procedure to be executed by a thread generated at Step 2204 will be described with reference to FIG. 26.

Each thread evaluates whether there is journal information in the journal queue 1101 (Step 2601). If there is the journal information, it is acquired (Step 2602). It is evaluated whether the error recovery processing corresponding to the target ID in the acquired journal information is coincident with the target ID under processing (Step 2603). If coincident, the compensation transaction processing part 1203 is executed (Step 2604), whereas if not, the procedure returns to Step 2601 to perform the processing for the next journal information.

After the compensation transaction processing part 1203 is executed, it is confirmed whether the processing has been completed normally (Step 2605). If completed normally, the procedure returns to Step 2601 to execute the processing for the next journal information. If completed abnormally, an abnormal completion is notified to the error recovery program 1102 to thereafter terminate the procedure (Step 2606). If it is judged at Step 2601 that there is no next journal information in the journal queue 1101, a normal completion is notified to the error recovery program 1102 to thereafter terminate the procedure (Step 2607).

According to this embodiment, the error recovery processing can be executed in parallel for each target server to which a request message was transmitted during the normal processing and for each channel to which a reply message was transmitted.

As described above, in the transaction processing system of this embodiment, the error recovery processing is executed in parallel in accordance with the target destination of each message which was transmitted by the workflow control system during the normal processing. It is therefore possible to improve the efficiency of the error recovery processing.

According to the present invention, the error recovery processing is executed in parallel for each path generated by the split process in the normal processing flow. It is therefore possible to improve the efficiency of the error recovery processing.

What is claimed is:

1. A transaction processing method for executing a series of a plurality of transactions in accordance with a workflow, comprising the steps of:

registering compensation processing as an error recovery flow when each transaction is executed, the compensation processing executing error recovery processing when an error occurs while the transaction is executed;

registering a join process as the error recovery flow when a split process is performed in accordance with the workflow, and the split process as the error recovery flow when the join process is performed; and executing a series of compensation processing in parallel in accordance with the registered error recovery flow, when an error occurs while any of the transaction is executed.

2. A transaction processing method for executing a series of a plurality of transactions in accordance with a workflow, comprising the steps of:

registering journal information representative of the contents of an executed transaction when the transaction is executed, said journal information including an identifier for identifying a path of the workflow and an identifier for identifying a path for split process and join process is stored when the transaction is executed; and acquiring the journal information when an error occurs while the transaction is executed, and executing a compensation transaction in parallel, the compensation transaction executing error recovery processing in accordance with the contents of each transaction registered in the journal information, and executing the error recovery processing in parallel for each path registered in the journal information.

3. A transaction processing apparatus for executing a series of a plurality of transactions in accordance with a workflow, comprising:

a normal processing part for registering compensation processing as an error recovery flow when each transaction is executed, the compensation processing executing error recovery processing when an error occurs while the transaction is executed;

a join processing part for registering a join process as the error recovery flow when a split process is performed in accordance with the workflow, and the split process as the error recovery flow when the join process is performed; and a compensation processing part for executing a series of compensation processing in parallel in accordance with the registered error recovery flow when an error occurs while any of the transaction is executed.

4. A transaction processing apparatus for executing a series of a plurality of transactions in accordance with a workflow, comprising:

a normal processing part for registering journal information representative of the contents of an executed transaction when the transaction is executed, said journal information including an identifier for identifying a path of the workflow and an identifier for identifying a path for split process and join process is stored when the transaction is executed; and a compensation processing part for acquiring the journal information when an error occurs while the transaction is executed, and executing a compensation transaction in parallel, the compensation transaction executing error recovery processing in accordance the contents of each transaction registered in the journal information.

5. A medium storing a program for operating a computer as a transaction processing apparatus for executing a series of a plurality of transactions in accordance with a work flow, the medium comprising:

a normal processing part for registering compensation processing as an error recovery flow when each transaction is executed, the compensation processing executing error recover processing when an error occurs while the transaction is executed;

a join processing part for registering a join process as the error recovery flow when a split process is performed in accordance with the workflow and the split process as the error recovery flow when the join process is performed; and a compensation processing part for executing a series of compensation processing in parallel in accordance with the registered error recovery flow when an error occurs while any of the transaction is executed.

6. A medium storing a program for operating a computer as a transaction processing apparatus for executing a series of a plurality of transactions in accordance with a workflow, the medium comprising:

a normal processing part for registering journal information representative of the contents of an executed transaction when the transaction is executed, said journal information including an identifier for identifying a path of the workflow and an identifier for identifying a path for split process and join process is stored when the transaction is executed; and a compensation processing part for acquiring the journal information when and error occurs while the transaction is executed, and executing a compensation transaction in parallel, the compensation transaction executing error recovery processing in accordance the contents of each transaction registered in the journal information.

7. A transaction processing method for executing a series of a plurality of transactions in accordance with a workflow, comprising steps of:

registering journal information representative of the contents of an executed transaction when the transaction is executed, said journal information including an identifier for identifying a target destination of a message is registered when the transaction is executed; and acquiring the journal information when an error occurs while the transaction is executed, and executing a compensation transaction in parallel, the compensation transaction executing error recovery processing in accordance the contents of each transaction registered in the journal information, and executing the error recovery processing in parallel for each target destination of each message registered in the journal information.

8. A transaction processing apparatus for executing a series of a plurality of transactions in accordance with a workflow, comprising:

a normal processing part for registering journal information representative of the contents of an executed transaction when the transaction is executed, said journal information including an identifier for identifying a target destination of a message is registered when the transaction is executed; and a compensation processing part for acquiring the journal information when an error occurs while the transaction is executed, and executing a compensation transaction in parallel, the compensation transaction executing error recovery processing in accordance the contents of each transaction register in the journal information, and executing the error recovery processing in parallel for each target destination of each message registered in the journal information.

9. A medium storing a program for operating a computer as transaction processing apparatus for executing a series of a plurality of transactions in accordance with a workflow the medium comprising:

a normal processing part for registering journal information representative of the contents of an executed transaction when the transaction is executed, said journal information including an identifier for identifying a target destination of a message is registered when the transaction is executed; and a compensation processing part for acquiring the journal information when an error occurs while the transaction is executed, and executing a compensation transaction in parallel, the compensation transaction executing error recovery processing in accordance the contents of each transaction registered in the journal information, and executing the error recovery processing in parallel for each target destination of each message registered in the journal information.

* * * * *